(12) United States Patent
Spicer

(10) Patent No.: US 6,422,263 B1
(45) Date of Patent: Jul. 23, 2002

(54) NESTED AND CASCADED VARIABLE BIAS FEEDFOWARD AND FEEDBACK FLOW AND LEVEL CONTROL SYSTEM

(76) Inventor: Guy Kevin Spicer, 1771 Bergen Ct., Lawrenceville, GA (US) 30043

( * ) Notice: Subject to any disclaimer, the term of this patent is extended or adjusted under 35 U.S.C. 154(b) by 0 days.

(21) Appl. No.: 09/655,296

(22) Filed: Sep. 5, 2000

(51) Int. Cl.[7] .................................................. G05D 9/12
(52) U.S. Cl. ........................ 137/391; 137/395; 137/558; 137/571; 700/281; 700/282; 340/618
(58) Field of Search ................................. 137/558, 386, 137/391–395, 571, 572; 702/55; 210/97, 143, 255, 744; 340/618; 700/281, 282

(56) References Cited

U.S. PATENT DOCUMENTS 5,472,312 A * 12/1995 Takeda et al.
5,575,303 A * 11/1996 Hulbert

FOREIGN PATENT DOCUMENTS

| JP | 61263688 A | * 11/1984 |
| JP | 61202212 A | * 9/1986 |

OTHER PUBLICATIONS

M. Klinck, "Control of the surface–water purification plant of the Amsterdam Waste–Supply Authority", Philps Technical Review, 1976, vol. 36, No. 10, pp. 273–283.*

Kashiwagi et al., "Computer Control System for Water and Wastewater Treatment Plants", Hitachi Review, 1978, vol. 27, No. 3, pp. 146–152.*

* cited by examiner

Primary Examiner—Joseph W. Drodge
Assistant Examiner—Terry K. Cecil
(74) Attorney, Agent, or Firm—Guy K. Spicer

(57) ABSTRACT

A control system for maintaining the liquid levels in a plurality of reservoirs connected in series includes a parenthetical control module and one or more nested control modules. The parenthetical control module includes a proportional only level controller in electrical communication with the level sensor of said last reservoir ($V_{OUT}$) in the series and is adapted to produce an output signal that becomes a set point for one or more PID flow controllers controlling the inflow ($F_{IN}$) into the first reservoir ($V_1$) in the series. The nested control module, one for each reservoir upstream of said last reservoir ($V_{OUT}$), includes a proportional only level controller in electrical communication with the respective level sensor of each respective upstream reservoir and is adapted to produce an output that becomes a set point for one or more PID flow controllers adapted to control the respective outflows of said respective upstream reservoirs. The control system results in maintaining liquid levels in the reservoirs while substantially eliminating flow and level oscillations.

9 Claims, 27 Drawing Sheets

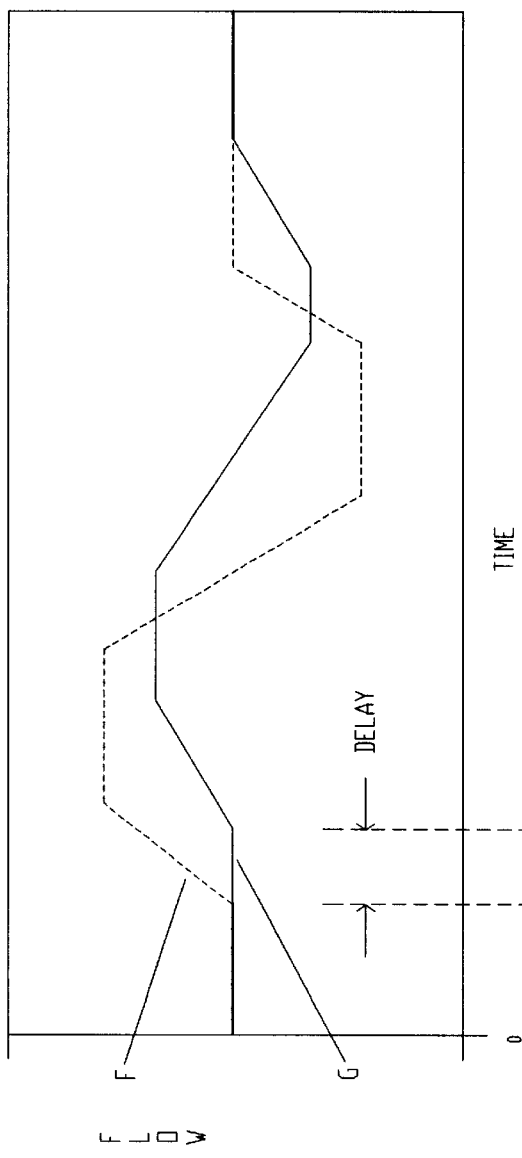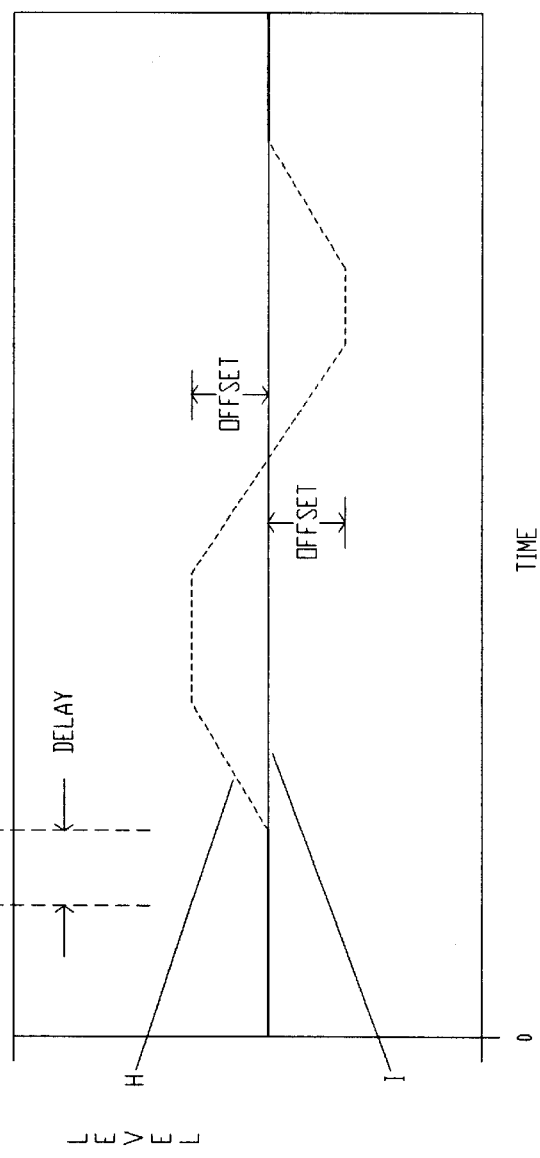

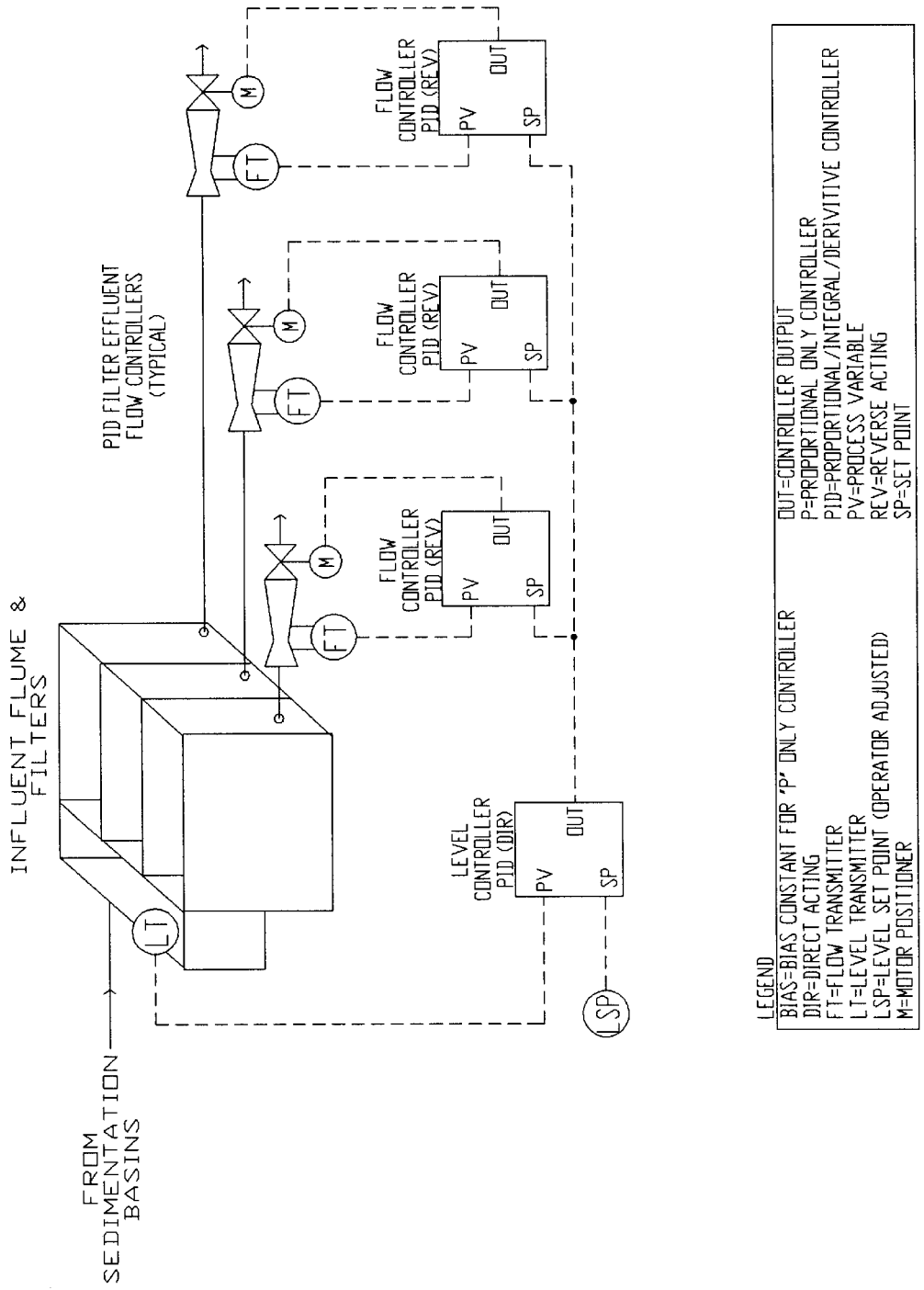

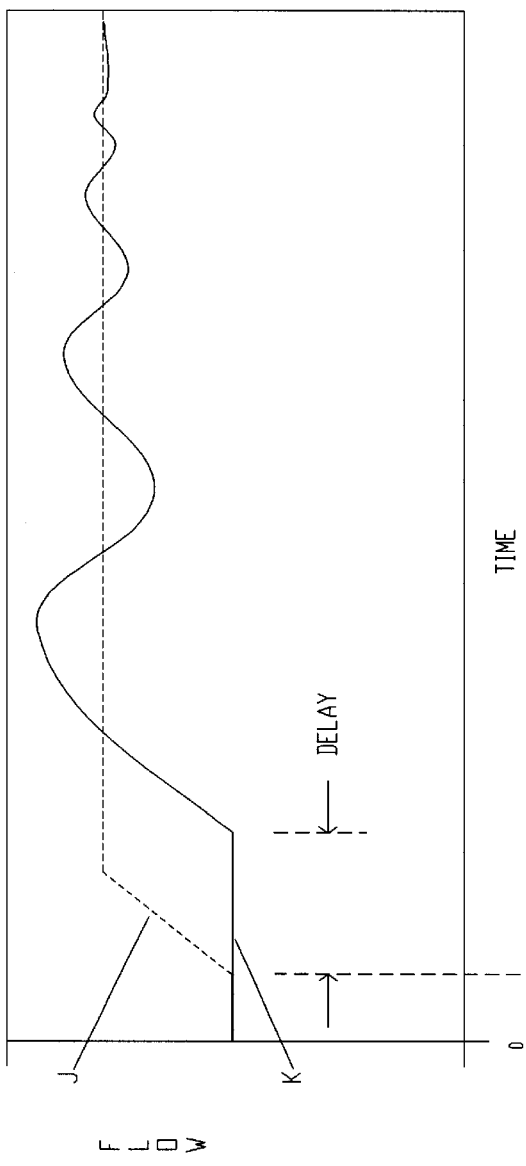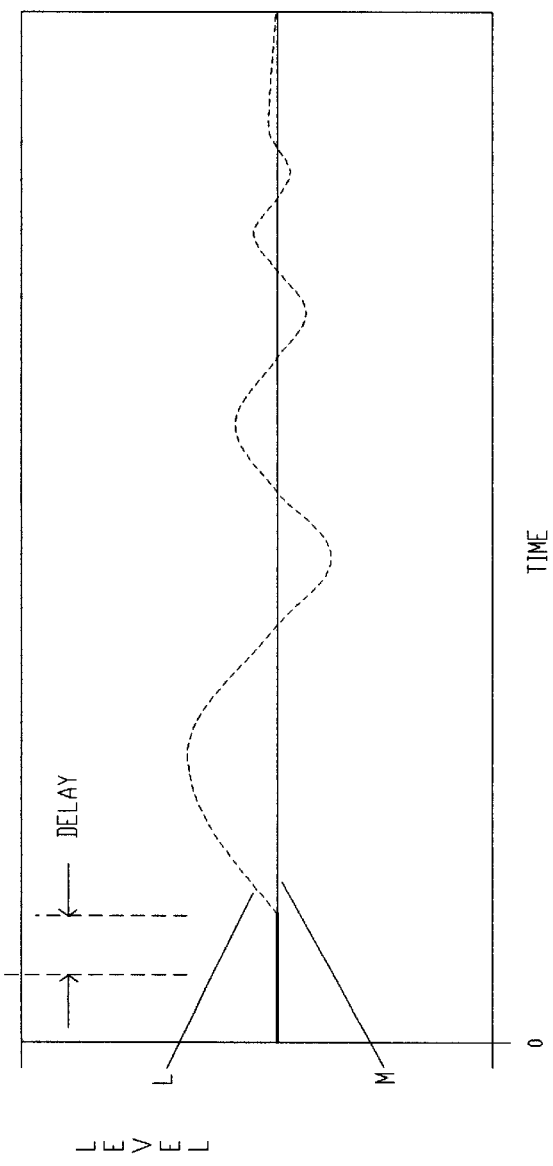

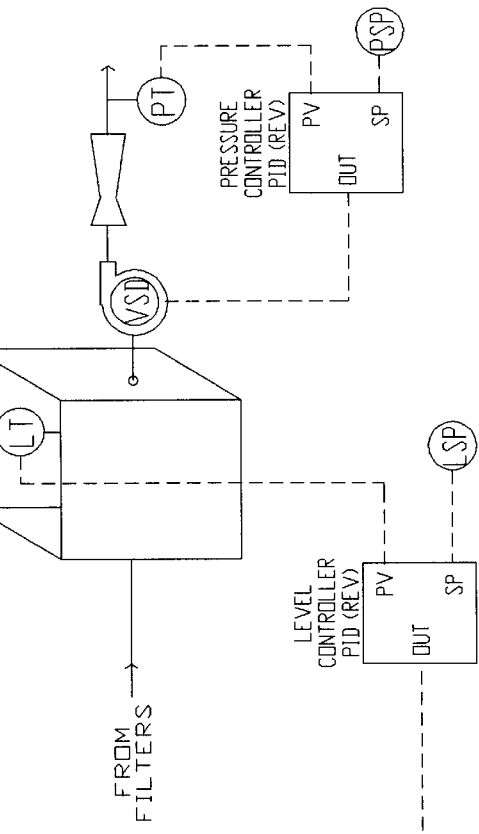
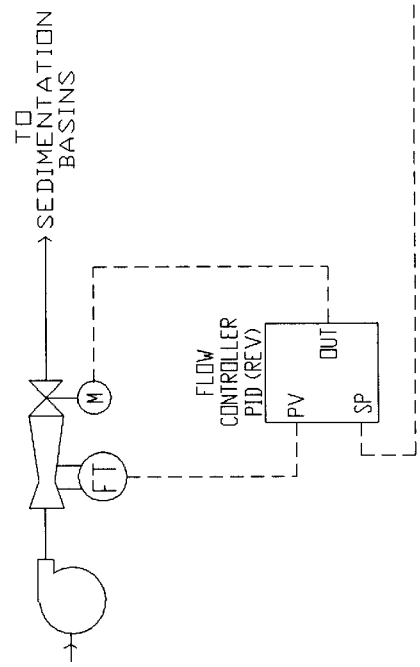
FIG. 12 PRIOR ART

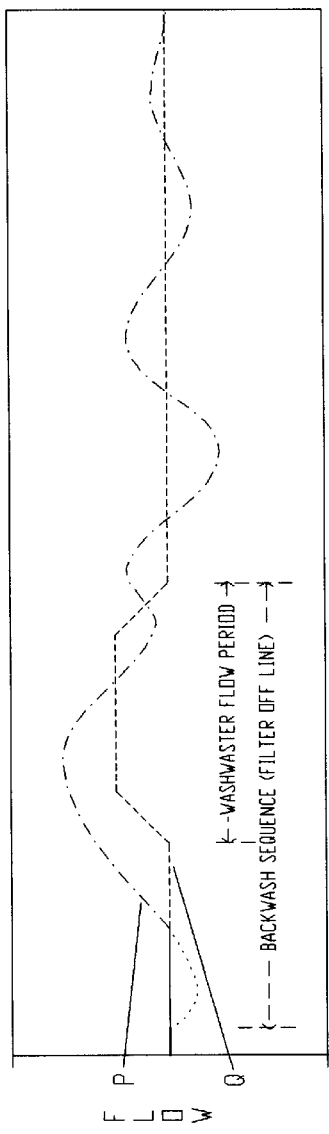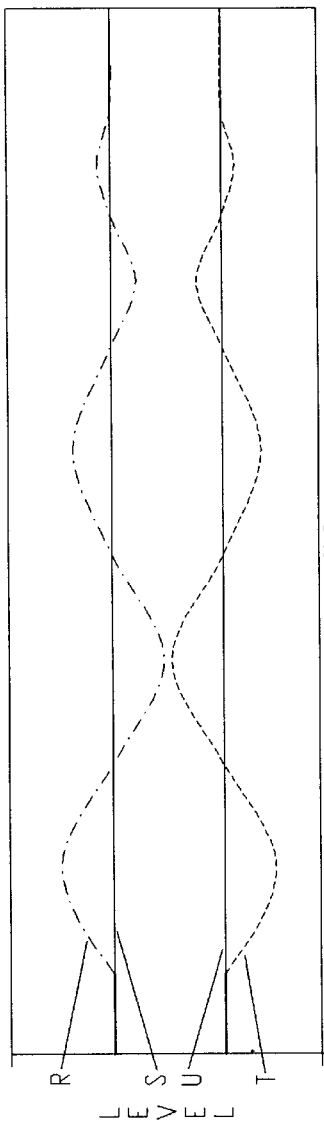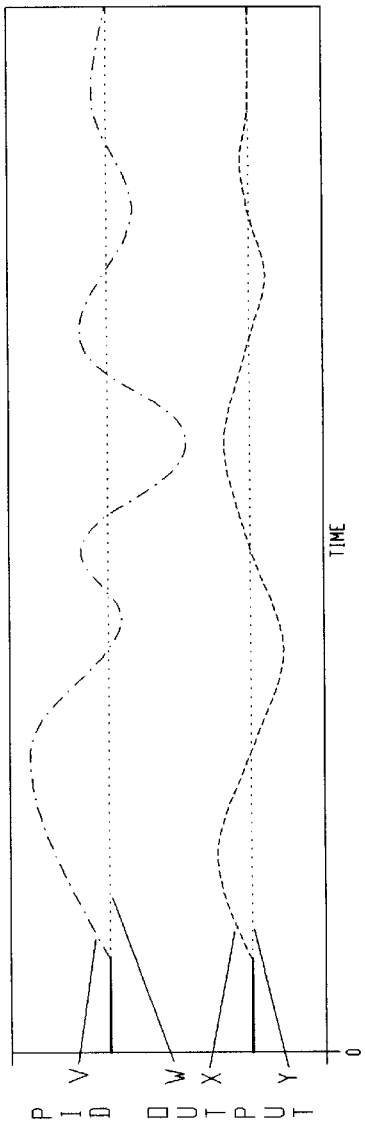
FIG. 17 PRIOR ART
FIG. 18 PRIOR ART
FIG. 19 PRIOR ART

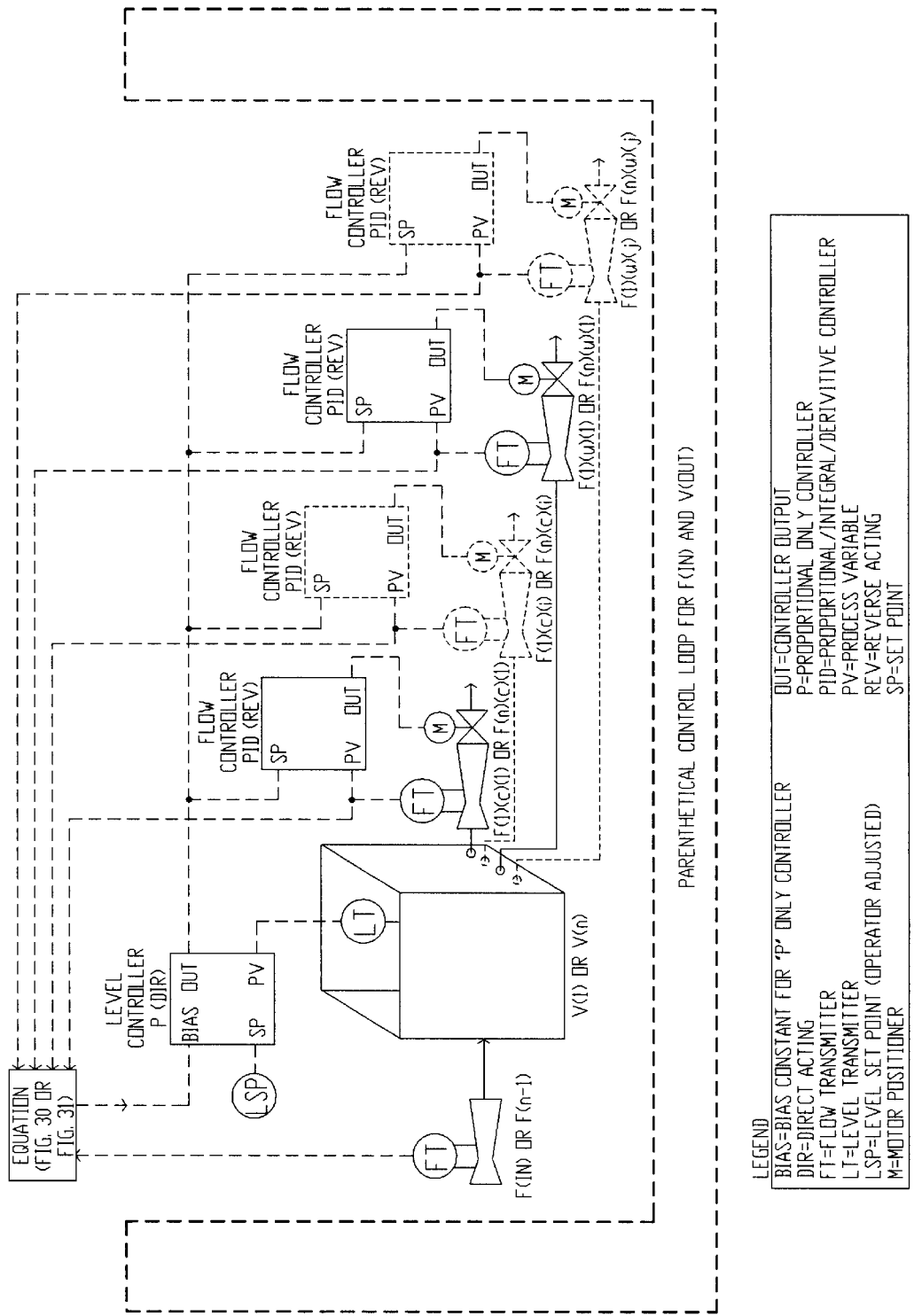

$$F(OUT)/q$$ FIG. 26

$$[F(OUT)-\sum_1^r F(IN)(u)]/q$$ FIG. 27

$$[F(IN)-\sum_1^j F(1)(u)]/i$$ FIG. 30

$$[F(n-1)-\sum_1^j F(n)(u)]/i$$ FIG. 31

$$E(DIR)=PV-SP$$ FIG. 32

$$E(REV)=SP-PV$$ FIG. 33

$$OUT=(E)*G+BIAS$$ FIG. 34

$$OUT=(E)*G+R*\int_0^t (E)dt$$ FIG. 35

$$[F(OUT)(1)+F(OUT)(2)-F(IN)(u)(1)]/2$$ FIG. 38

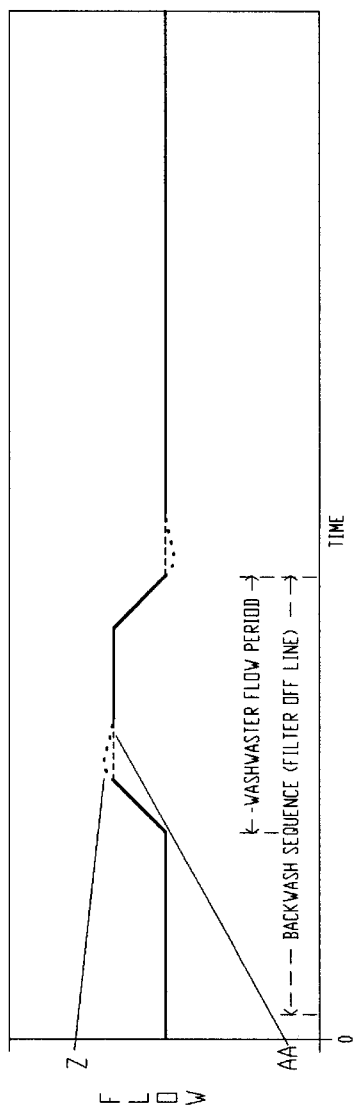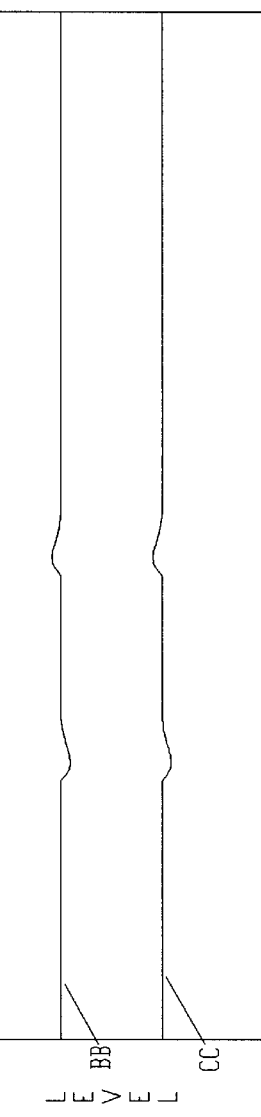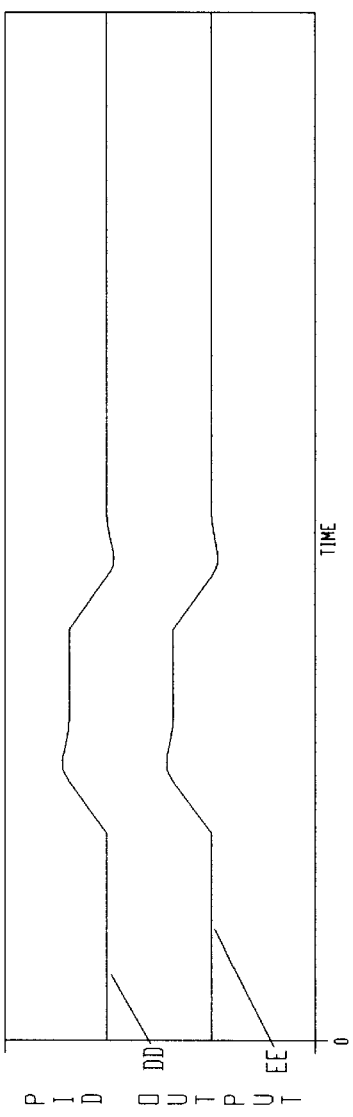

NESTED AND CASCADED VARIABLE BIAS FEEDFOWARD AND FEEDBACK FLOW AND LEVEL CONTROL SYSTEM

CROSS-REFERENCE TO RELATED APPLICATIONS

Not Applicable

STATEMENT REGARDING FEDERALLY SPONSORED RESEARCH OR DEVELOPMENT

Not Applicable

REFERENCE TO A MICROFICHE APPENDIX

Not Applicable

BACKROUND-FIELD OF INVENTION

The technical field on this invention relates to fluid handling in a plurality of reservoirs connected in series. This invention involves innovative changes to the uses and configurations of the traditional proportional only (P), and proportional/integral/derivative control algorithms (PID) as they have been applied to maintain system demand and minimize disturbances to the critical levels within a process. Although this invention has been birthed out of needs specifically attributable to the water treatment industry as recognized by the applicant pursuant to over 20 years of process control experience in the field, the invention can be applied to all other liquid handling processes where demand fluctuates and reservoir or vessel level is desired to be maintained at a specific level.

BACKROUND-PRIOR ART

Please refer to FIG. 1 Prior Art for a general simplified layout of a typical water treatment facility. This drawing shows pumped raw water influent to sedimentation basins, then flowing by gravity to a common flume which hydraulically links multiple sand filters. Each filter effluent then flows by gravity to an effluent clearwell from which water is pumped to maintain system demand.

The water treatment industry has long recognized the importance of minimizing filter flow rate fluctuations to minimize the breakthrough of turbidity (i.e. trapped sediment within the filter media bed) to the effluent clearwell to insure a clean water supply. Thus, different control schemes have been utilized by the industry to minimize water level (i.e. flume level) fluctuations in gravity flow sand filters. This is due to the fact that head pressure across the media bed varies with fluctuating level and since flow is proportional to the square root of the differential pressure across the filter, flow rate also fluctuates. Referring to FIG. 2 Prior Art depicting the relationship of flow rate to differential pressure, for a given effluent valve position the effect of pressure differential (as related to filter water level) is even more significant at lower flow rates.

To further aggravate the situation, as trapped sediment builds up within the media bed during the filter run period (filter run period defined as the period of time filtering occurs between filter backwashes) the hydraulic head pressure decreases, thus requiring the filter effluent valve to open further to maintain a set flow rate. Since filters are backwashed one at a time on a staggered basis to minimize disruption to the water plant's water production capability, the head loss for a given filter will not be the same as any other and can vary by as much as four to five feet or more.

The scenario in which the quality of filtered water could be maximized would be where plant effluent demand would remain constant, filter level would remain constant, and the positions of the filter effluent valves would gradually increase over the course of the filter run to maintain a constant filter flow with increasing head loss across the filter media bed during the filter run. This scenario however is totally unrealistic since plant effluent demand does change and filters must be backwashed. Thus, the challenge is one where filtered water quality must be optimized with plant demand and other system disturbances, which requires filter flow rates to change as little as and as smoothly as possible. Based on fluctuating flume level with varying degrees of head loss as these variables relate to flow as described previously, if filter flow rates can be made to follow system demand while maintaining constant flume level, not only is filtered water quality optimized with plant demand, but the water production calculation data required by the regulatory agencies such as filter load rates are much more consistent, realistic and accurate.

The problem, however, becomes more complicated because at this point, only the first phase of water production and associated levels and flows has been discussed. Ultimately, filtered water must pass to the effluent clearwell, which is used as a storage medium for plant effluent pumping. As such, the water treatment industry has long recognized the need to minimize clearwell water level fluctuations in order to be responsive to system demand and various control schemes have been utilized to accomplish this. Further, the trend of state governments responding to the increased restrictions mandated by the Federal EPA for water quality has been to consider the effluent clearwell as the chemical contact chamber for chemical post treatment. This consideration requires the effluent clearwell to be maintained within certain set levels, below which fines may be imposed. This is so because it is recognized that contact time of the water to be treated with the chemicals is essential to the bonding process and the ultimate effectiveness of the chemical treatment, and that contact time increases with higher and reasonably steady state set levels. Similarly as for flume level, the water production calculation data required by the regulatory agencies such as chemical contact time is much more consistent, realistic, accurate, and accepted with a reasonably steady state clearwell level.

Further to the issue of responding to the increased requirements of the regulatory agencies, the credibility of the computer-based historical data collection and reporting systems concerning the provision of meaningfully accurate and consistent report data often times is a problem for municipalities. Since all computer-based data collection systems monitor process variable signal data by sampling techniques, accuracy decreases as these variables fluctuate, and this is again another reason to optimize the responsiveness of the water plant to system demand while minimizing the fluctuations in process level and flow variables. Inherent inaccuracies with these data collection systems are further aggravated when there are calibration errors and discrepancies amongst the various flow measuring devices that go undetected for indeterminate amounts of time.

Various control schemes have been implemented over the years in an attempt to control both flume level and clearwell level for the reasons mentioned previously. These schemes have attempted to address the challenge of maintaining these levels in a situation where the hydraulic design of the water plant requires the control aspects of these levels to be in competition with one another. These control schemes are herein described with their flaws.

Refer to the control scheme for flume level control depicted on FIG. 3 Prior Art. This configuration for flume level control utilizes dedicated proportional/integral/derivative (PID) flow controllers for each filter. A single proportional only (P) direct acting level controller output is cascaded to the set point inputs of the various PID reverse acting filter effluent flow controllers.

Referring to FIG. 4 Prior Art, shows the output responses of the direct acting proportional only flume level controller shown in FIG. 3 based on example gain values of 1 (waveform "D") and 2 (waveform "C"), a bias constant of approximately 64% (waveform "E"), and a flume level set point of approximately 84% (waveform "B"). The typical proportional only filter influent flume level controller is set up to measure over a 0 to 7 foot range where the desired control set level is approximately 6 feet and the control action is such that the output will swing from 0 to 100% when the level swings from minus 6 inches to plus 6 inches (control band) around the 6-foot level set point. This correlates to a gain of approximately 7, or a proportional band of approximately 14%. The bias constant input is selected to shift the control band to the 6-foot "null" point of the controller. With this configuration, although very stable, flume level is maintained at set point only at the "null" point of the controller. As such, for all practical purposes, an offset between actual flume level and desired set point level always exists. The output (cascaded to the set point inputs of the filter flow controllers) is a predetermined value based on gain (or proportional band) and has an indirect relationship to what is actually flowing into the filters.

FIG. 5 Prior Art is a depiction of the flow into the flume or filters (waveform "F") as contrasted to the calculated output (or in other words the total filter effluent flow set point) over time for a cascaded direct acting proportional only flume level controller with constant bias. This controller output (waveform "G") is cascaded to multiple reverse acting proportional/integral/derivative (PID) filter effluent flow controllers and is in actuality the filter effluent flow set point. For simplicity, it is assumed that the responses of the filter effluent flow PID controllers are instantaneous and that filter effluent flow rate is also depicted by waveform "G". The "Delay" depicted by the two vertical dotted lines shows the time it takes subsequent to a change in filter influent flow before the controller begins to make a correction due to level. The thickened horizontal portions of the waveforms at the beginning and at the end of the time period depict where both waveforms "F" and "G" are resting on top of each other. In this example, it can be seen that "G" increases to a lesser degree than "F" (based on typical gain values chosen) and after an initial process delay. This initial delay is proportional to the time it takes the flume level to increase due to the increase in filter influent flow, waveform "F".

FIG. 6 Prior Art is a depiction of the level in the flume or filters over time (waveform "H") as a result of the increased flow into the flume or filters (waveform "F" of FIG. 5 previously) as contrasted to the flume level set point (waveform "I"). Note that the "Delay" depicted by the two vertical dotted lines shows the time it takes subsequent to a change in influent flow before the level in the flume or filters begins to change, and such delay is aligned with the delay described previously for FIG. 5. The thickened horizontal portions of the waveforms at the beginning and at the end of the time period depict where both waveforms "H" and "I" are resting on top of each other.

The reason the type of level control described for FIG. 3, FIG. 4, FIG. 5, and FIG. 6 is not ultimately satisfactory is because the flow out of the filters is not a direct function of the flow into the filters across the full range of flow. Thus it is demonstrated that only when filter influent flow is at the "null" point as described previously is flume level able to be controlled at set point level.

Another control scheme for flume level control is depicted on FIG. 7 Prior Art. This configuration addresses the offset problem described for FIG. 3, FIG. 4, FIG. 5, and FIG. 6 by upgrading the flume level controller from proportional only (P) to proportional/integral/derivative (PID). In this manner, flume level can be maintained at set point level over the full range of flow into the flume. This is so because the output of the flume level PID controller "searches" for the correct flow set point output to be cascaded to the filter flow PID controllers over time. However, due to the potential for oscillation typical of cascading two PID controllers, both the flume level PID controller and the filter flow PID controllers must be detuned in order to minimize this problem. As a result, the control system is slow to respond and process flow and level fluctuate (overshoot and undershoot) unnecessarily when there is a change in system effluent demand, during a filter backwash, or when filter influent flow changes.

FIG. 8 Prior Art is a depiction of the flow into the flume or filters (waveform "J") as contrasted to the calculated output (or in other words the total filter effluent flow set point) over time for a cascaded direct acting proportional/integral/derivative flume level controller. This controller output (waveform "K") is cascaded to multiple reverse acting proportional/integral/derivative (PID) filter effluent flow controllers and is in actuality the filter effluent flow set point. For simplicity, it is assumed that the responses of the filter effluent flow PID controllers are instantaneous and that filter effluent flow rate is also depicted by waveform "K". The "Delay" depicted by the two vertical dotted lines shows the time it takes subsequent to a change in filter influent flow before the controller begins to make a correction due to level. The thickened horizontal portion of the waveform at the beginning of the time period depicts where both waveforms "J" and "K" are resting on top of each other.

FIG. 9 Prior Art is a depiction of the level in the flume or filters over time (waveform "L") as a result of the increased flow into the flume or filters (waveform "J" of FIG. 8 previously) as contrasted to the flume level set point (waveform "M"). Note that the "Delay" depicted by the two vertical dotted lines shows the time it takes subsequent to a change in filter influent flow before the level in the flume or filters begins to change. The delay described previously for FIG. 8 is longer than this delay due to the PID flume level controller detuning necessary to reduce the effect of oscillation. The thickened horizontal portion of the waveform at the beginning of the time period depicts where both waveforms "L" and "M" are resting on top of each other. Subsequent delays are experienced as the flume level changes above and below the set point until the controller output "hones in" on the value of filter effluent flow that gradually brings flume level back to set point.

The reason the type of level control described for FIG. 7, FIG. 8, and FIG. 9 is not ultimately satisfactory is because the flow out of the filters is not a direct function of the flow into the filters across the full range of flow. As can be seen, any change in filter influent flow causes unnecessary modulation in filter effluent flow and flume level in order to bring flume level back to set point level.

The implementation of clearwell level control is first depicted in the configuration shown on FIG. 10 Prior Art. A reverse acting proportional only (P) clearwell level controller with constant bias is cascaded through a low select function to a reverse acting proportional/integral/derivative (PID) plant influent flow controller. The output of the low select function serves as the set point input to the plant influent flow controller. The output of the plant influent flow controller is a position demand signal to the respective valve motor positioner. The output of the low select function is the lesser of the operator adjusted plant influent flow set point (FSP) or the clearwell level controller output. This serves to override the operator adjusted plant influent flow set point if the clearwell level is exceedingly high so that plant influent flow is reduced below the manual influent flow set point. Plant effluent closed loop control is shown with a reverse acting proportional/integral/derivative (PID) system pressure controller whose output is a speed demand to a variable speed drive for a pump.

The control configuration shown in FIG. 10 is not ultimately satisfactory because the flow into the clearwell is not a direct function of the flow out of the clearwell. To minimize this design problem, operations personnel must constantly adjust the plant influent flow set point to match changes in plant effluent demand to keep the clearwell level within high and low limits. This is exceedingly difficult, since the effect of a change in plant influent flow on clearwell level is not seen and therefore cannot be analyzed as to its accuracy until some time after the adjustment is made. This difficult situation is made nearly impossible when adjustments are made during periods when plant effluent flow is also changing to keep up with system demand. Further, the offset problem as described previously for FIG. 3, FIG. 4, FIG. 5, and FIG. 6 with proportional only level control is experienced here as well.

An alternate clearwell level control configuration is depicted on FIG. 11 Prior Art. This is very similar to that described for FIG. 10 except that an added level of control is implemented through a second clearwell level controller and associated low select function. The reverse acting proportional only (P) level controller and low select function both labeled "No.1" operate as described for FIG. 10 previously. The output of an additional direct acting proportional only (P) clearwell level controller "No.2" with constant bias, or the output of the plant effluent reverse acting proportional/integral/derivative (PID) system pressure controller is selected through a low select "No. 2" function. The output of low select function "No.2" is the lesser of these two signals and serves to reduce the speed of the variable speed drive if the clearwell level is exceedingly low.

The control configuration shown in FIG. 11 is not ultimately satisfactory for the same reasons described for FIG. 10. The same operational drawbacks described for FIG. 10 also apply here.

The clearwell level control configuration depicted in FIG. 12 is a modification to that described in FIG. 10. It removes the low select function and addresses the offset problem described for FIG. 3, FIG. 4, FIG. 5 and FIG. 6 by upgrading the clearwell level controller from proportional only (P) to proportional/integral/derivative (PID). In this manner, clearwell level can be maintained at set point level over the full range of flow into the plant. This is so because the output of the clearwell level PID controller "searches" for the correct flow set point output to be cascaded to the plant influent flow PID controller over time. However, due to the potential for oscillation typical of cascading two PID controllers, both the clearwell level PID controller and the plant influent flow PID controller must be detuned in order to minimize this problem. As a result, the control system is slow to respond and process flow and level fluctuate (overshoot and undershoot) unnecessarily when there is a change in system effluent demand or during a filter backwash.

The clearwell level control configuration depicted in FIG. 13 is a modification to that described in FIG. 12. It replaces the proportional/integral/derivative (PID) clearwell level controller with a proportional only (P) controller with variable bias. The variable bias is the desired plant influent flow set point. Thus, when clearwell level is at desired set point, the level controller output to the set point input of the plant influent flow controller is the manually adjusted flow set point, FSP. This is an improvement over the first design described in FIG. 10 in that operations personnel can be less attentive to making adjustments to the plant influent flow set point, FSP. However again, this control configuration shown in is not ultimately satisfactory because the flow into the clearwell is not a direct function of the flow out of the clearwell. Further, the offset problem as described previously for FIG. 3, FIG. 4, FIG. 5, and FIG. 6 with proportional only level control is experienced here as well.

FIG. 14 Prior Art is a depiction of the flow into the clearwell (i.e. out of the filters) as contrasted to the effective total plant effluent flow over time for a cascaded direct acting proportional/integral/derivative (PID) flume level controller in conjunction with a cascaded reverse acting proportional/integral/derivative (PID) clearwell level controller. The thickened portion of the waveforms shown at the far left up to the dotted vertical line denoting the beginning of the "Backwash Sequence (Filter Off Line)" shows waveforms "N", "O", "P", and "Q" laying on top of each other and an otherwise steady state condition. When the backwash sequence begins and the pertinent filter is taken off line, waveform "O" depicting total filter effluent flow drops briefly below waveform "N". Waveform "N" depicts effective total plant effluent flow out of the clearwell as well as the PID flume level controller output which acts as the set point input to the filter effluent PID controllers. Partway into the "Backwash Sequence (Filter Off Line)" period but before the beginning of the "Washwater Flow Period" waveform "O" rejoins waveform "N" at the point where it splits into waveform "P" and waveform "Q". Waveform "P" depicts the PID flume level controller output (acting as the set point input to the filter effluent flow PID controllers) and for simplicity, it is assumed that the responses of the filter effluent flow PID controllers are instantaneous and that this waveform depicts filter effluent flow as well. Waveform "Q" depicts the effective plant effluent flow output and demonstrates increased clearwell outflow due to pumped backwash water flow during the "Washwater Flow Period". The waveforms shown on this figure are time synchronized and related to the waveforms shown on FIG. 15 and FIG. 1.

FIG. 15 Prior Art is a depiction of the level in the flume or filters over time (waveform "R") as contrasted to the flume level set point (waveform "S") as a result of a cascaded direct acting proportional/integral/derivative (PID) flume level controller in conjunction with a cascaded reverse acting proportional/integral/derivative (PID) clearwell level controller. In particular, waveform "R" is the response of the flume/filter level as a result of the disturbance placed on the system by the start of the backwash sequence depicted in FIG. 14. The thickened horizontal portion of the waveform at the beginning of the time period depicts where both waveforms "R" and "S" are resting on top of each other. The waveforms shown on this figure are time synchronized and related to the waveforms shown on FIG. 14 and FIG. 1.

FIG. 16 Prior Art is a depiction of the level in the clearwell over time (waveform "T") as contrasted to the clearwell level set point (waveform "U") as a result of a cascaded direct acting proportional/integral/derivative (PID) flume level controller in conjunction with a cascaded reverse acting proportional/integral/derivative (PID) clearwell level controller. In particular, waveform "T" is the response of the clearwell level as a result of the disturbance placed on the system by the start of the backwash sequence and the start of the washwater flow period depicted in FIG. 14. The thickened horizontal portion of the waveform at the beginning of the time period depicts where both waveforms "T" and "U" are resting on top of each other. The waveforms shown on this figure are time synchronized and related to the waveforms shown on FIG. 14 and FIG. 15.

FIG. 17 Prior Art is a replication of FIG. 14 shown in for the purpose of showing time synchronization and interrelationship of numerous system variables depicted as waveforms on FIG. 18 and FIG. 19.

FIG. 18 Prior Art is a replication of FIG. 15 and FIG. 16 shown on for the purpose of showing time synchronization and interrelationship of numerous system variables depicted as waveforms on FIG. 17 and FIG. 19.

FIG. 19 Prior Art is a depiction of a typical filter effluent flow proportional/integral/derivative controller output (waveform "V") as contrasted to a steady state baseline (waveform "W") as a result of a cascaded direct acting proportional/integral/derivative (PID) flume level controller in conjunction with a cascaded reverse acting proportional/integral/derivative (PID) clearwell level controller. In particular, waveform "V" is the position demand output to the filter effluent valve positioners (for the remaining filters not being backwashed) in response to the flume level as a result of the disturbance placed on the system by the start of the backwash sequence and the start of the washwater flow period depicted in FIG. 17. The thickened horizontal portion of the waveform at the beginning of the time period depicts where both waveforms "V" and "W" are resting on top of each other. The waveforms shown on this figure are time synchronized and related to the waveforms shown on FIG. 17 and FIG. 18. Additionally, waveform "X" is the speed demand output to the variable speed pump drive for the system pressure controller (while waveform "Y" is a steady state baseline) as a result of the change in clearwell level due to the disturbance placed on the system by the start of the backwash sequence and the start of the washwater flow period depicted in FIG. 17. The thickened horizontal portion of the waveform at the beginning of the time period depicts where both waveforms "X" and "Y" are resting on top of each other.

As can be seen, FIGS. 17 through 19 show a certain amount of instability as well as oscillatory dynamics built into the designs of the prior art. This results in excessive wear and tear on flow regulating devices such as valves and pumps. For the water treatment industry, these designs do not minimize the potential for turbidity breakthrough, and therefore do not provide maximum treatment potential.

BRIEF SUMMARY

The object of this invention is to provide a fluid transportation system which has solved the previously described problems of the prior art. The measured levels of a system of a plurality of vessels or reservoirs interconnected by pipeline or open channel in which flow measuring and manipulating devices are placed can be maintained at desired level set points by appropriately regulating such flows. For a given number of reservoirs or vessels in a system where demand responsiveness is required of the outflow of the last vessel or reservoir in a series, flow regulation is accomplished utilizing a single level controller for the last vessel in the series whose output is cascaded back to the flow controller(s) for the flow into the first vessel or reservoir in the series, this control module labeled as the "parenthetical" module. Flow regulation out of all remaining vessels or reservoirs in the series is accomplished utilizing as many replications as necessary of a module consisting of a level controller whose output is cascaded forward to the flow controller(s) for the flow out of such vessel or reservoir in the series, this control module labeled as the "nested" module.

For a given number of reservoirs or vessels in a system where demand responsiveness is required of the inflow to the first vessel or reservoir in a series, flow regulation is accomplished utilizing as many replications as necessary of the "nested" module previously mentioned without the use of the "parenthetical" module.

All level controllers are configured as proportional only with variable bias resulting from universal equations such that the controller is immediately responsive to changes in system flow in advance of an actual change in level. The variable bias calculation contemplates universal system dynamics such as whether the flow controllers receiving the associated level controller output as their respective set point inputs are actually able to be responsive to such set point input.

OBJECTS AND ADVANTAGES

As a result of the above, ultimate system responsiveness and stability is realized, levels are maintained at desired set points with minimum delay and with no oscillation even in the most significant of system disturbances. Because of this, the wear and tear on the flow manipulating devices such as valves and pumps is minimized. Also, flow rate fluctuations are minimized, and therefore for water treatment applications turbidity breakthrough is minimized and water quality maximized. Finally, the inherent inaccuracies associated with any associated data collection system are minimized because the invention reveals calibration errors and discrepancies amongst the various flow measuring devices that typically go undetected for indeterminate amounts of time.

Further objects and advantages of this invention will become apparent from a consideration of the drawings and ensuing description.

BRIEF DESCRIPTION OF THE SEVERAL VIEWS OF THE DRAWINGS

FIG. 5: Prior art depiction of the flow into the flume or filters as contrasted to the calculated output over time for a cascaded direct acting proportional only flume level controller with constant bias.

FIG. 6: Prior art depiction of the level in the flume or filters over time as a result of the increased flow into the flume or filters as contrasted to the flume level set point.

FIG. 7: Prior art depiction of a direct acting proportional/integral/derivative flume level controller cascaded to multiple reverse acting proportional/integral/derivative filter effluent flow controllers.

FIG. 8: Prior art depiction of the flow into the flume or filters as contrasted to the calculated output over time for a cascaded direct acting proportional/integral/derivative flume level controller.

FIG. 9: Prior art depiction of the level in the flume or filters over time as a result of the increased flow into the flume or filters as contrasted to the flume level set point.

FIG. 12: Prior art depiction of a reverse acting proportional/integral/derivative clearwell level controller whose output is cascaded to a reverse acting proportional/integral/derivative plant influent flow controller.

FIG. 17: Prior art replication of FIG. 14 shown on.

FIG. 18: Prior art replication of FIG. 15 and FIG. 16.

FIG. 19: Prior art depiction of a typical filter effluent flow proportional/integral/derivative controller output as contrasted to a steady state baseline and the corresponding speed demand output to the variable speed pump drive for the system pressure controller.

FIG. 25: This is another embodiment of a "nested" module of the invention.

FIG. 26: This is an equation used with a "parenthetical" module of the invention.

FIG. 27: This is a universal equation used with a "parenthetical" module of the invention.

FIG. 28: This is a universal equation used with a "nested" module of the invention.

FIG. 29: This is a universal equation used with a "nested" module of the invention.

FIG. 30: This is a universal equation used with a "nested" module of the invention.

FIG. 31: This is a universal equation used with a "nested" module of the invention.

FIG. 32: This is an equation for the error calculation for a direct acting controller recognized by the industry.

FIG. 33: This is an equation for the error calculation for a reverse acting controller recognized by the industry.

FIG. 34: This is an equation for a proportional only controller recognized by the industry.

FIG. 35: This is a simplified equation for a proportional/integral/derivative controller recognized by the industry.

FIG. 36: This is a specific example equation developed from a universal equation for a "nested" module.

FIG. 37: This is a specific example equation developed from a universal equation for a "nested" module.

FIG. 38: This is a specific example equation developed from a universal equation for a "parenthetical" module.

FIG. 43: This is a depiction of the response of the filter effluent flow into the clearwell as contrasted to the effective total plant effluent flow over time as a result of the invention and as a result of a system backwash disturbance.

FIG. 44: This is a depiction of the filter influent flume level and clearwell level response from the invention as a result of a system backwash disturbance.

FIG. 45: This is a depiction of the filter effluent flow controller controlled variable output to the valve motor positioners for filters not being backwashed and the speed demand output to the variable speed pump drive for the system pressure controller as a response of the invention as a result of a system backwash disturbance.

LIST OF REFERENCED WAVEFORMS

Figure 1:
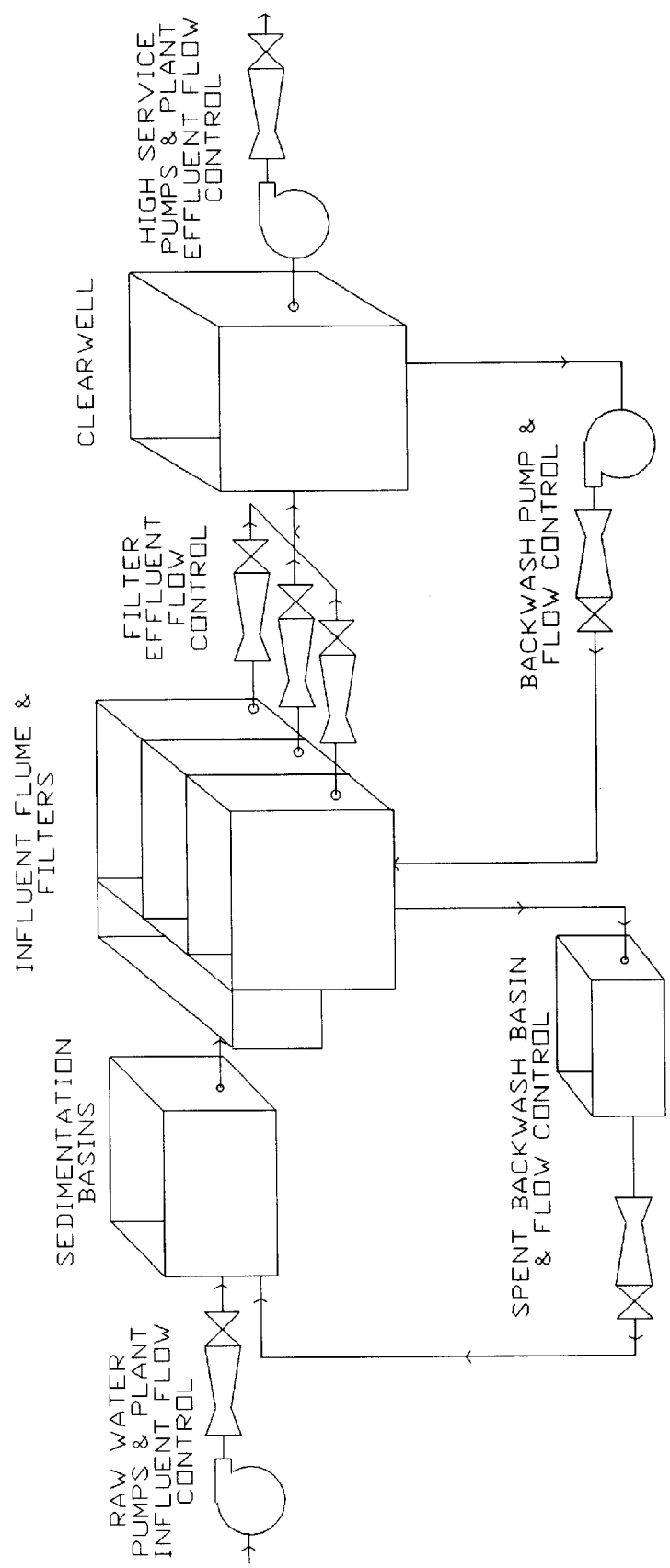
FIG. 1: Depicts a generally detailed typical water treatment plant layout.
Figure 2:
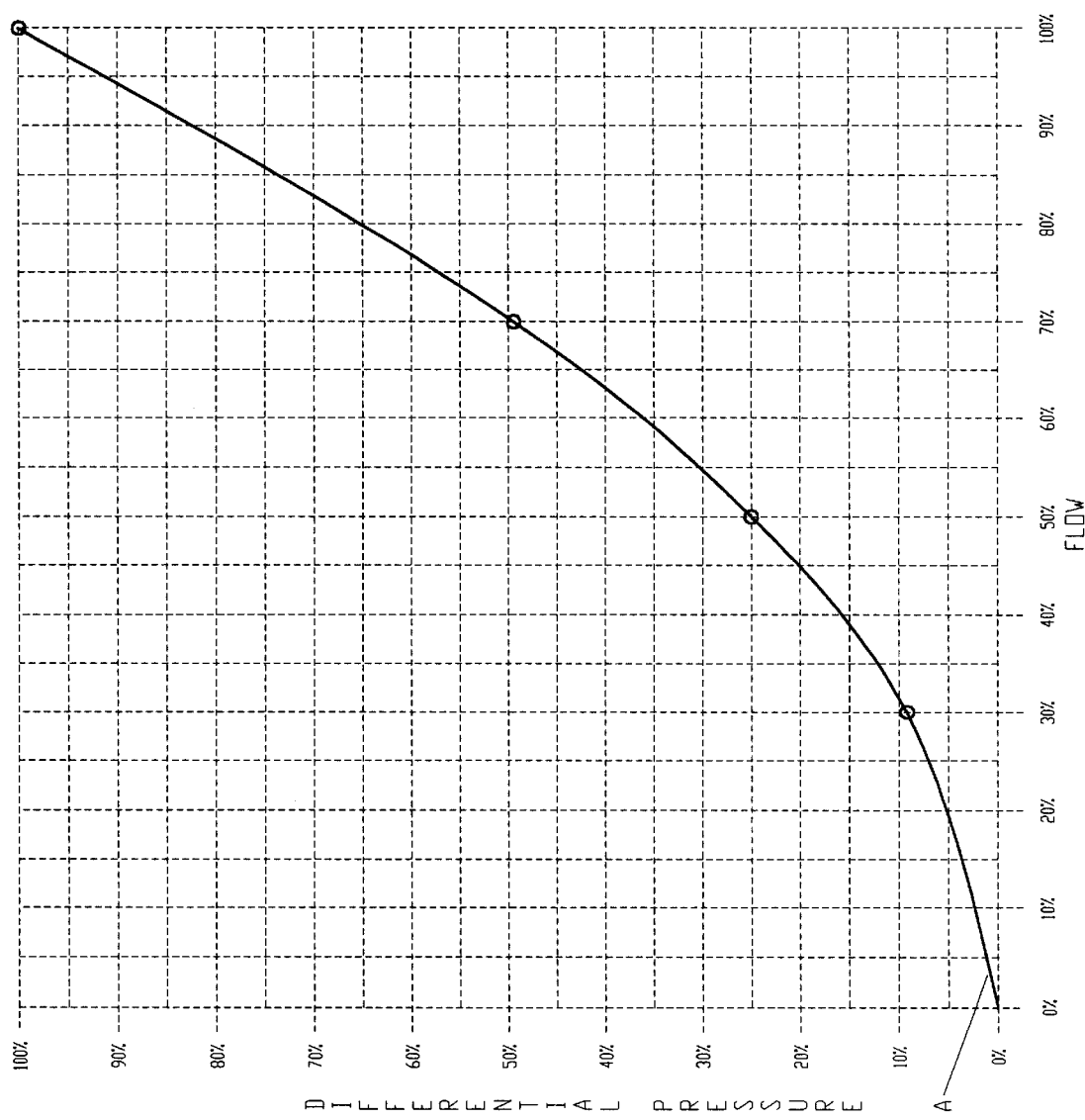
FIG. 2: Shows the relationship of differential pressure measured across a natural or man-made restriction in a pipeline with respect to flow rate through said restriction.
Figure 3:
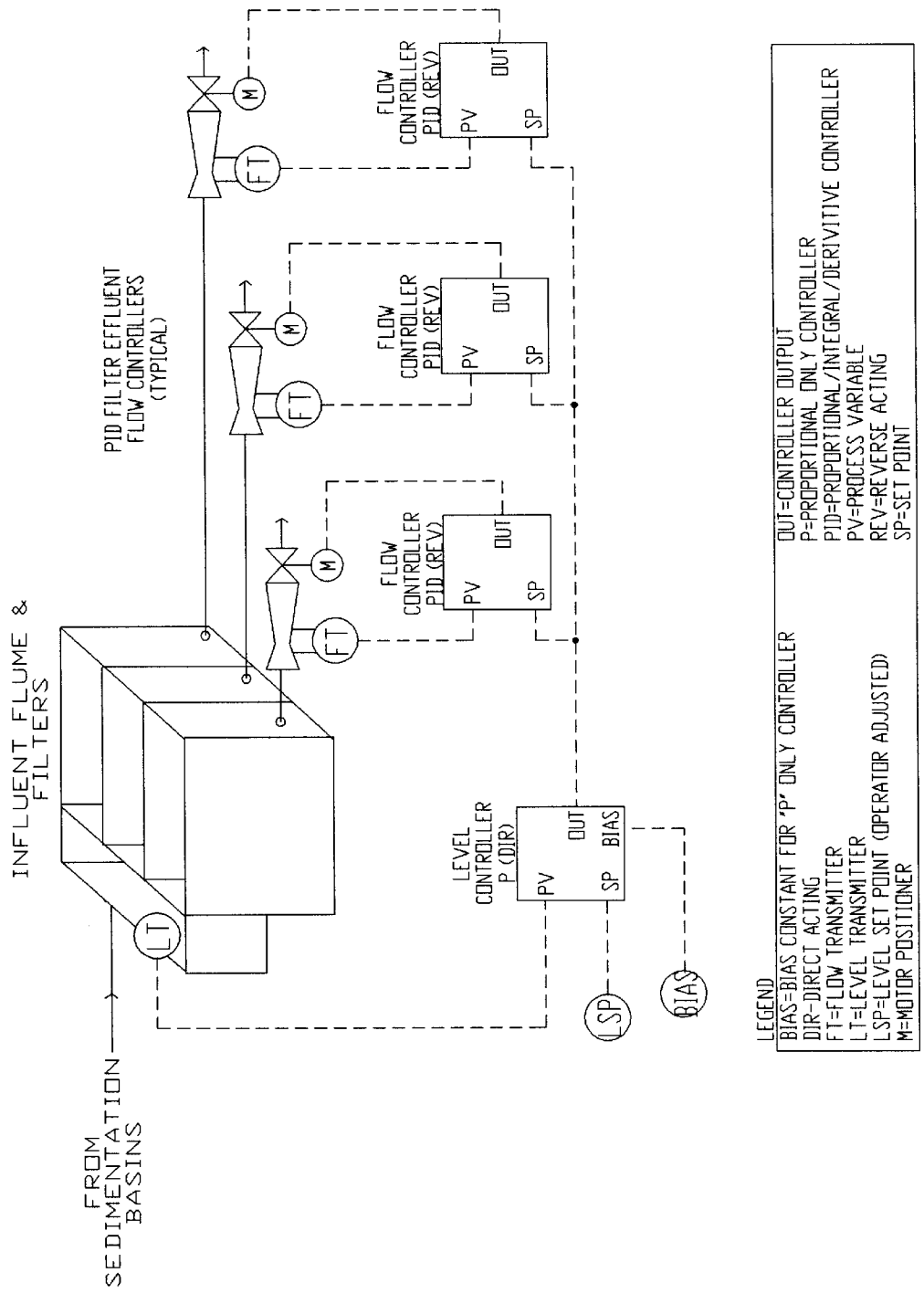
FIG. 3: Prior art depiction of a cascaded direct acting proportional only flume level controller with constant bias cascaded to multiple reverse acting proportional/integral/derivative filter effluent flow controllers.
Figure 4:
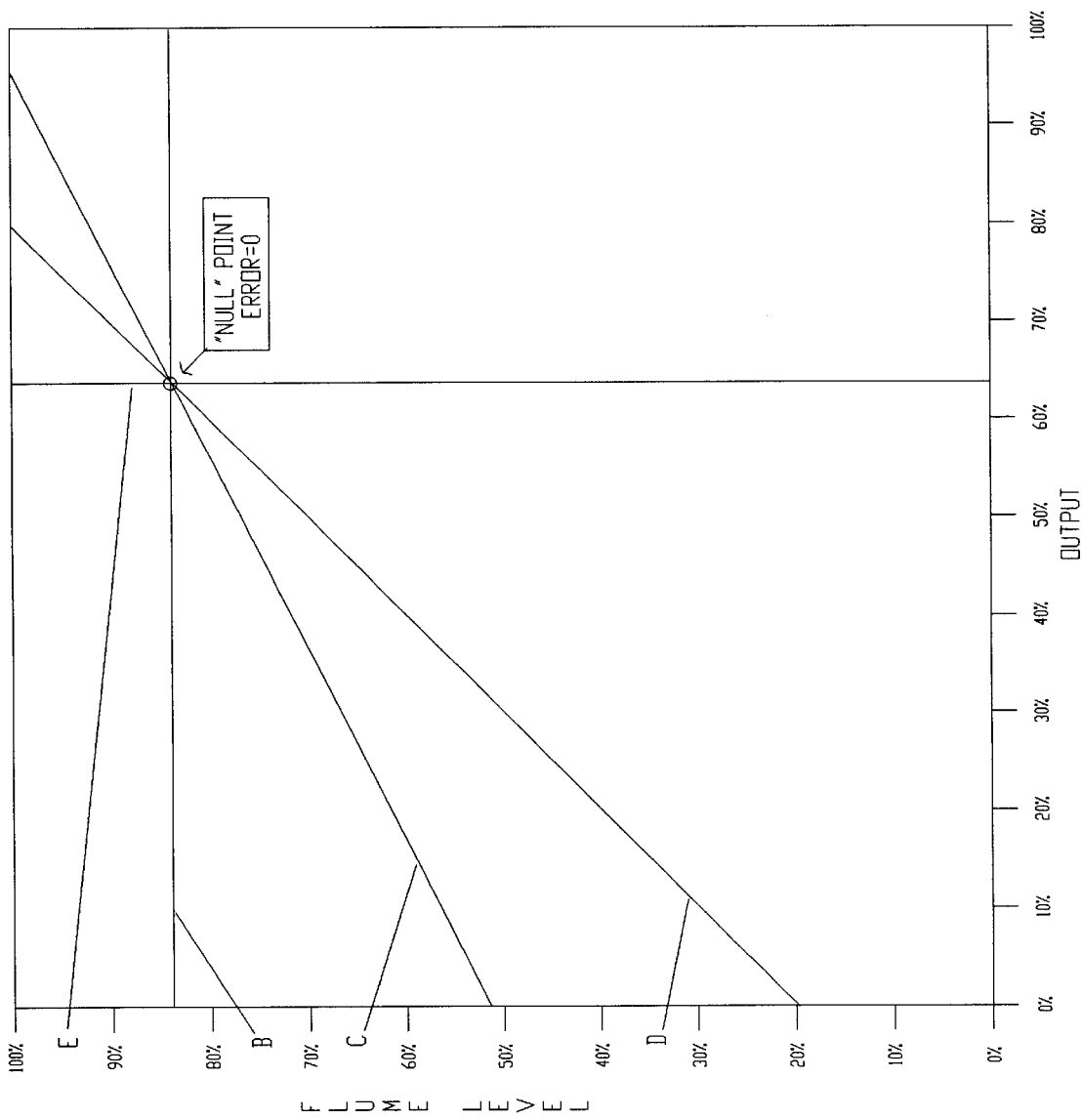
FIG. 4: Prior art depiction of the output responses of the direct acting proportional only flume level controller shown in FIG. 3.
Figure 10:
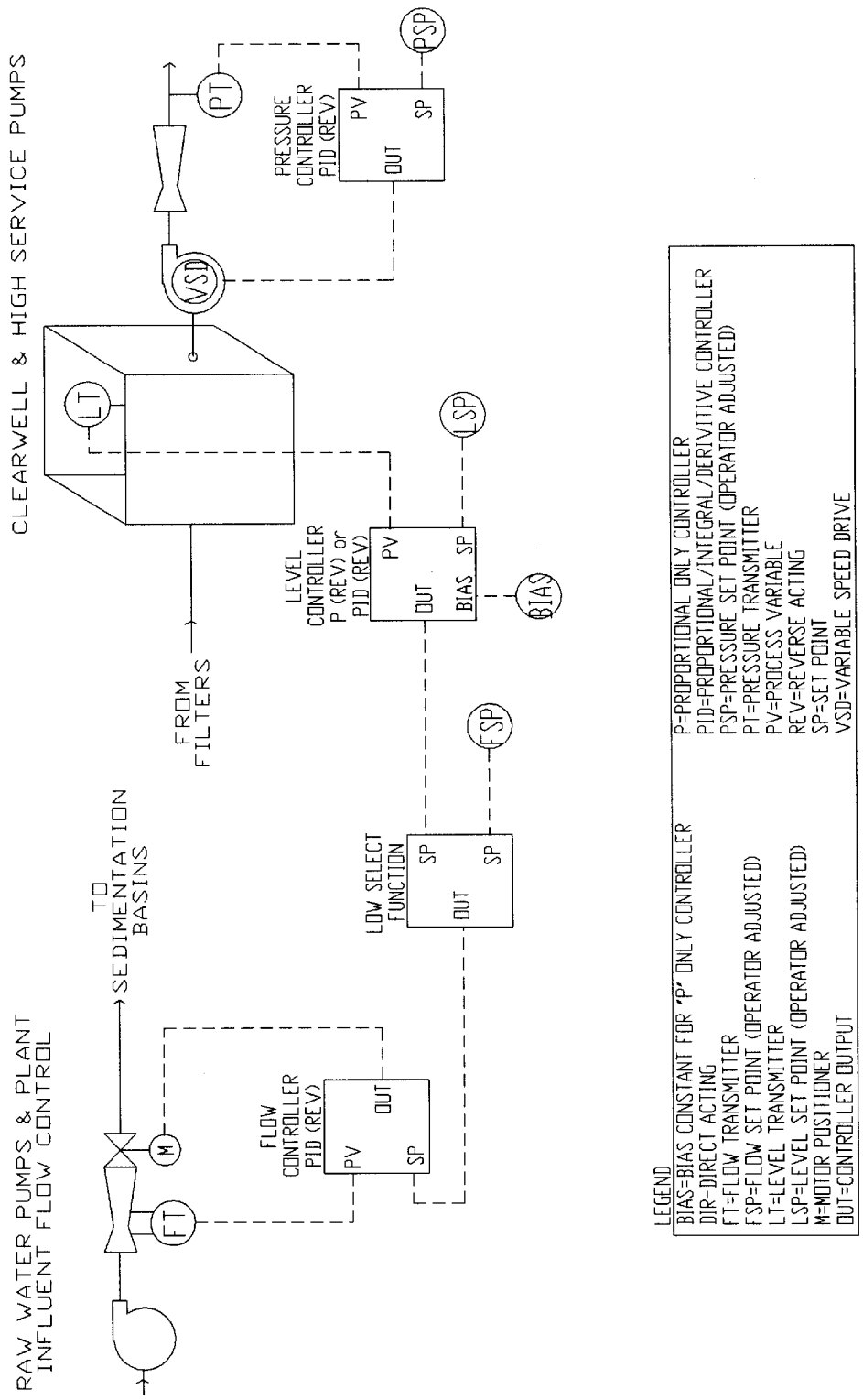
FIG. 10: Prior art depiction of a reverse acting proportional only clearwell level controller with constant bias cascaded through a low select function to a reverse acting proportional/integral/derivative plant influent flow controller.
Figure 11:
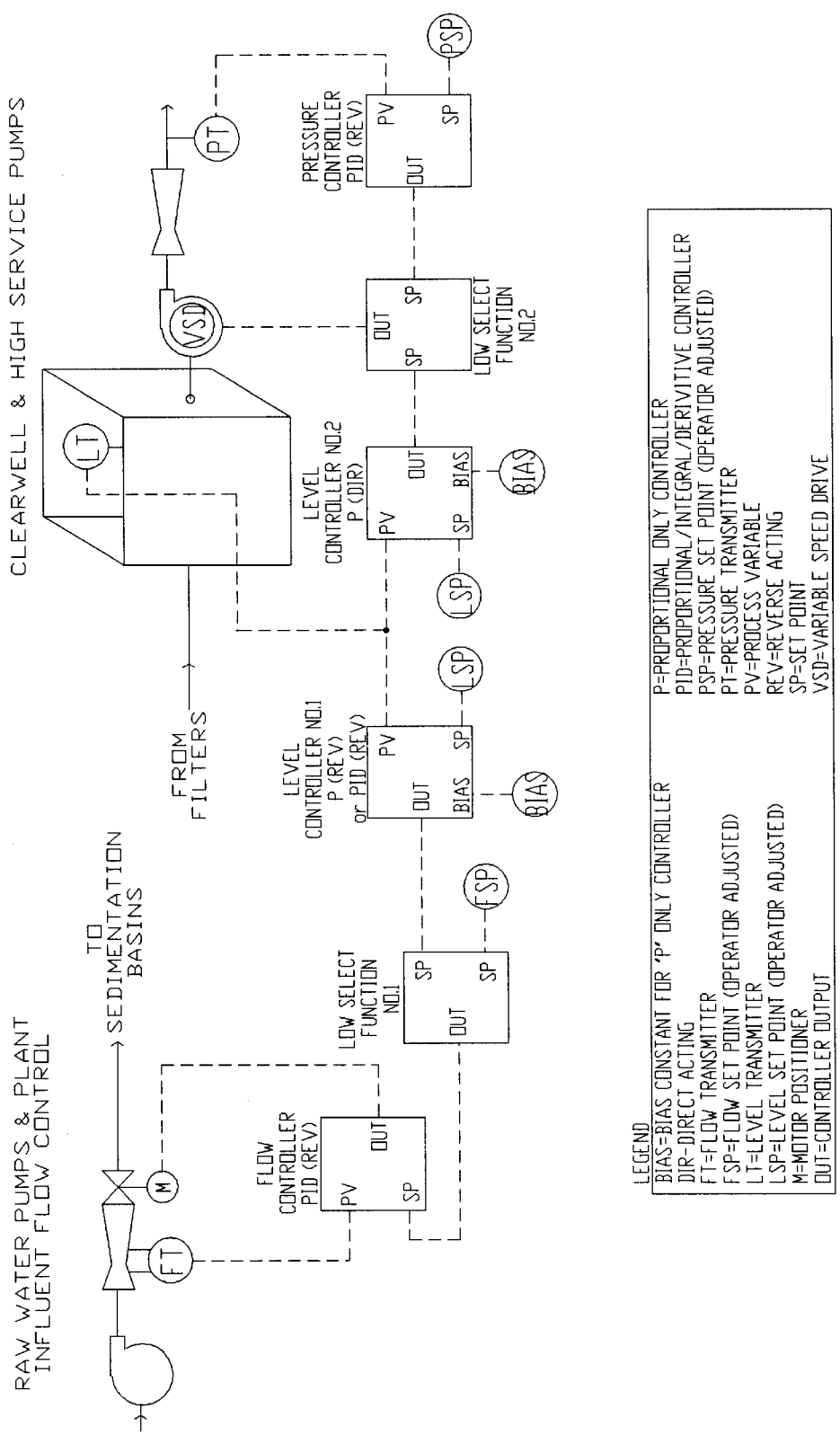
FIG. 11: Prior art depiction of two proportional only clearwell level controllers with constant bias whose outputs are cascaded through low select function to proportional/integral/derivative controllers.
Figure 13:
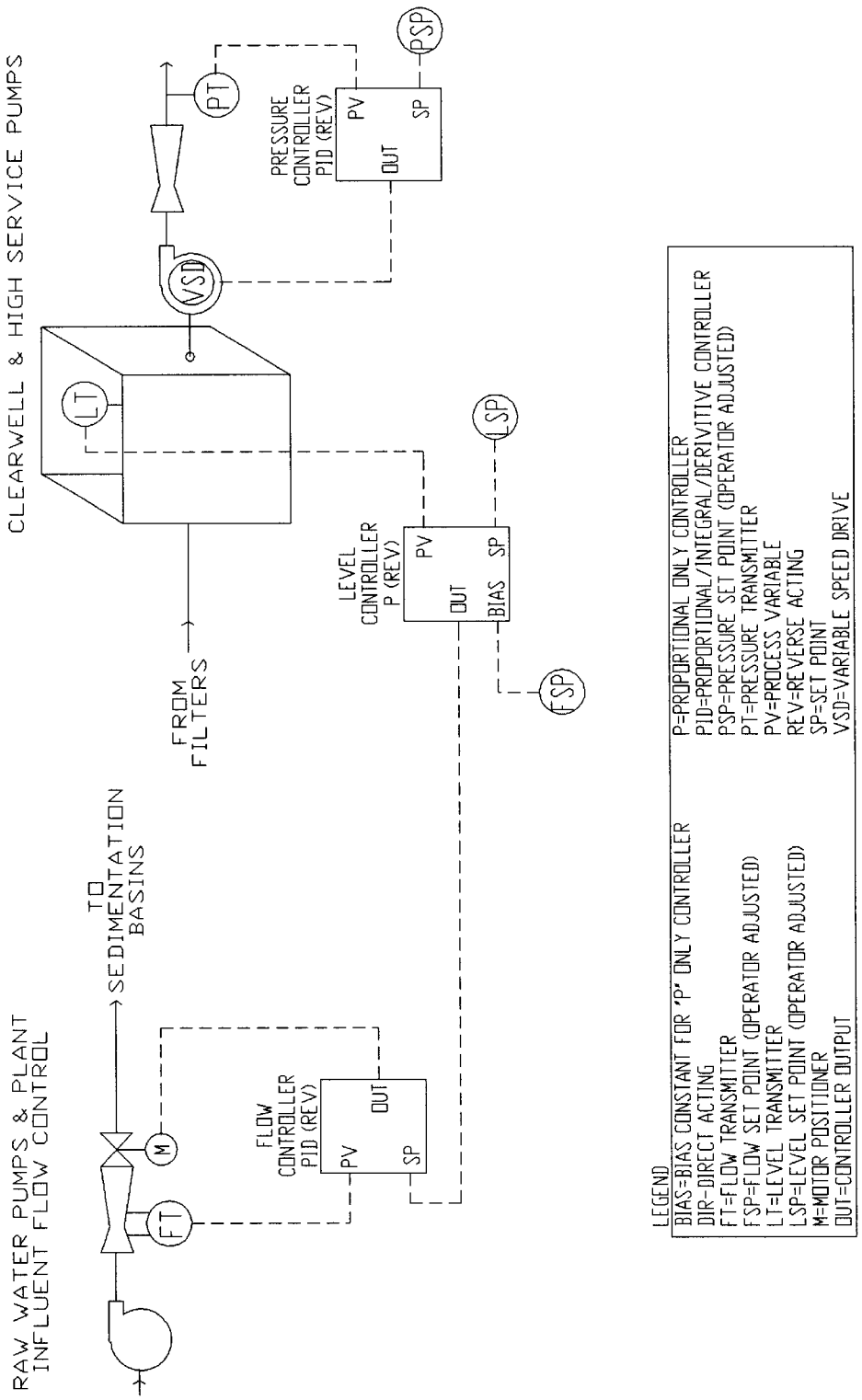
FIG. 13: Prior art depiction of a reverse acting proportional only clearwell level controller with the plant influent flow set point as the bias term whose output is cascaded to a reverse acting proportional/integral/derivative plant influent flow controller.

A: Differential pressure across a man-made restriction verses flow.

B: Prior art flume level set point.

C: Prior art proportional controller response for a gain of 2.

D: Prior art proportional controller response for a gain of 1.

E: Prior art proportional controller bias.

F: Prior art filter influent flow rate.

G: Prior art filter effluent flow rate and set point.

H: Prior art filter influent flume level.

I: Prior art filter influent flume level set point.

J: Prior art filter influent flow rate.

K: Prior art filter effluent flow rate and set point.

L: Prior art filter influent flume level.

M: Prior art filter influent flume level set point.

N: Prior art effective total plant effluent flow rate, filter effluent flow rate, and filter effluent flow set point.

O: Prior art filter effluent flow.

P: Prior art filter effluent flow and set point.

Q: Prior art effective total plant effluent flow.

R: Prior art flume level.

S: Prior art flume level set point.

T: Prior art clearwell level.

U: Prior art clearwell level set point.

V: Prior art filter effluent flow controller controlled variable output to valve motor positioner.

W: Prior art steady state baseline of filter effluent flow controller controlled variable output to valve motor positioner.

X: Prior art speed demand output to variable speed pump drive for the system pressure controller.

Y: Prior art steady state baseline of speed demand output to variable speed pump drive for the system pressure controller.

Z: Filter effluent (clearwell influent) flow rate.

AA: Effective total plant effluent flow rate.

BB: Flume level.

CC: Clearwell level.

DD: Filter effluent flow controller controlled variable output to valve motor positioners for filters not being backwashed.

EE: Speed demand output to variable speed pump drive for the system pressure controller.

DETAILED DESCRIPTION OF THE INVENTION

The measured levels of a system of a plurality of vessels or reservoirs interconnected by pipeline or open channel in which flow measuring and manipulating devices are placed can be maintained at desired level set points by regulating such flows by the use of my Nested and Cascaded Variable Bias Feedforward and Feedback Flow and Level Control System. For a given number of reservoirs or vessels, flow regulation is accomplished utilizing a single level controller for the last vessel in the series whose output is cascaded back to the flow controller(s) for the regulation of flow into the first vessel or reservoir in the series. These two cascaded controllers are labeled a "parenthetical" module. Flow regulation out of all but the last vessel or reservoir in the series is accomplished utilizing as many replications as necessary of a "nested" module consisting of a level controller whose output is cascaded forward to the flow controller(s) for the flow out of such vessel or reservoir in the series. The flow out of the last vessel or reservoir in the series responds to system demand criteria and it is this flow and level to which the invention is ultimately responsive. The combined use of the "parenthetical" module and the "nested" module of the invention is the subject matter of the first embodiment of the invention and is hereinafter described.

All flows (except the flow out of the last vessel or reservoir in the series) are regulated in a manner that eliminates flow and level oscillation, minimizes flow rate changes, minimizes the manipulation and associated wear and tear of flow control devices, reveals flow measurement calibration discrepancies, and provides ultimate system responsiveness by anticipating system disturbances or changes in demand and implementing corrective measures in advance of levels deviating from their respective set points.

All level controllers are configured as proportional only with variable bias such that the controller is immediately responsive to changes in system flow in advance of an actual change in level. The particular variable bias calculation contemplates universal system dynamics such as whether the flow controllers receiving the associated level controller output as their respective set point inputs are actually able to be responsive to such set point input in order to affect the output of the associated level controller. The following text describes the particular operation and configuration of theses modules and later describes specific application examples.

Figure 20:
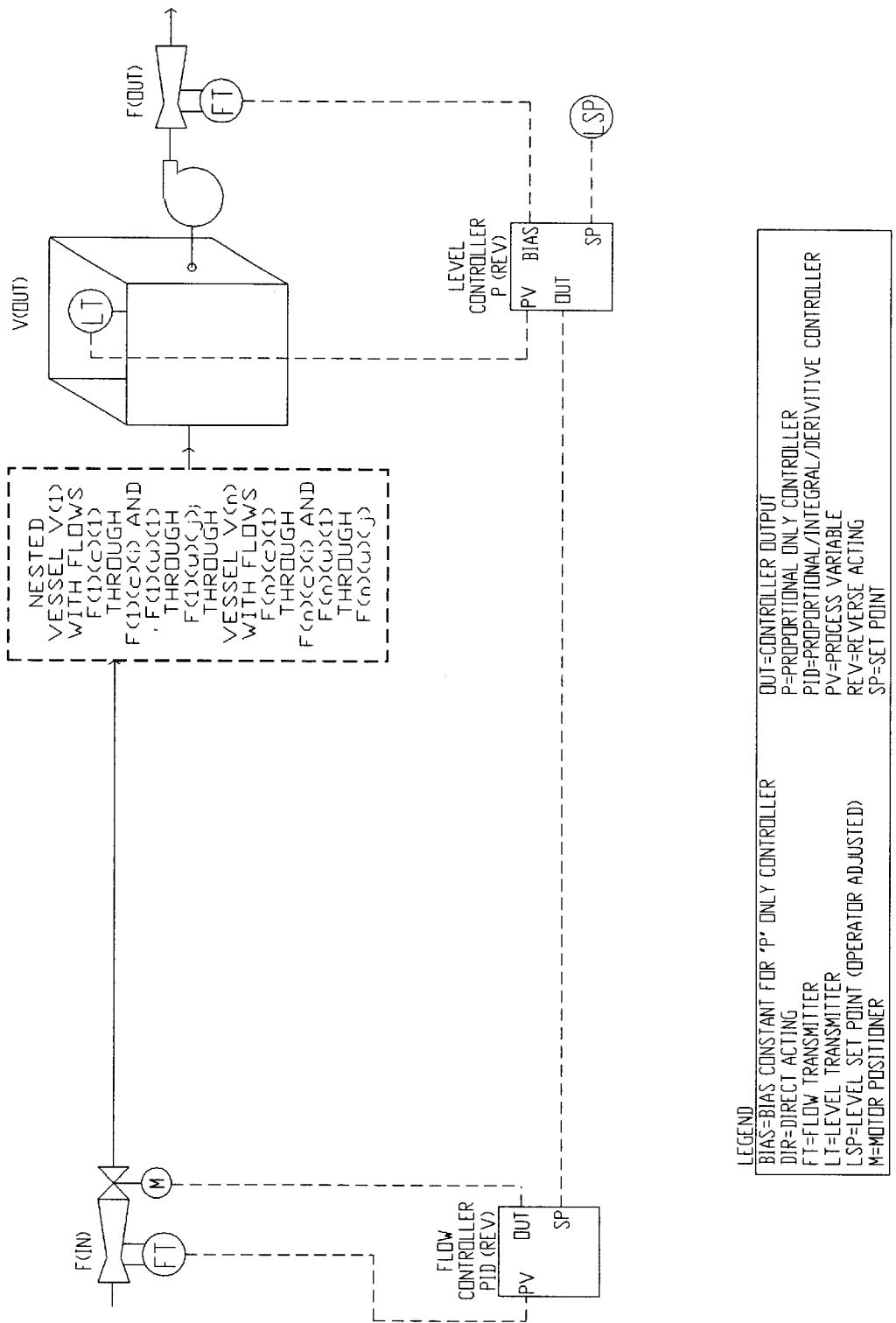
FIG. 20: This is the most basic embodiment of a single "parenthetical" module of the invention.

FIG. 20: This is a most basic embodiment of a single "parenthetical" module of the invention consisting of a reverse acting proportional only level controller for V(OUT) with total flow F(OUT) used as the bias input and whose output is cascaded to the set point input of a reverse acting proportional/integral/derivative flow controller for F(IN). The level controller is used for the last vessel V(OUT) in a series of vessels and the flow controller regulates the flow into the first vessel V(1) in the series of vessels. The desired level in V(OUT) is adjusted by the operator adjusted set point "LSP". These cascaded controllers together are termed the "parenthetical" module of the invention because it is used only one time and it is within which one or more "nested" modules of the invention are placed. The nested modules of the invention are depicted in FIG. 23, FIG. 24, FIG. 25, FIG. 28, FIG. 29, FIG. 30, and FIG. 31.

Figure 21:
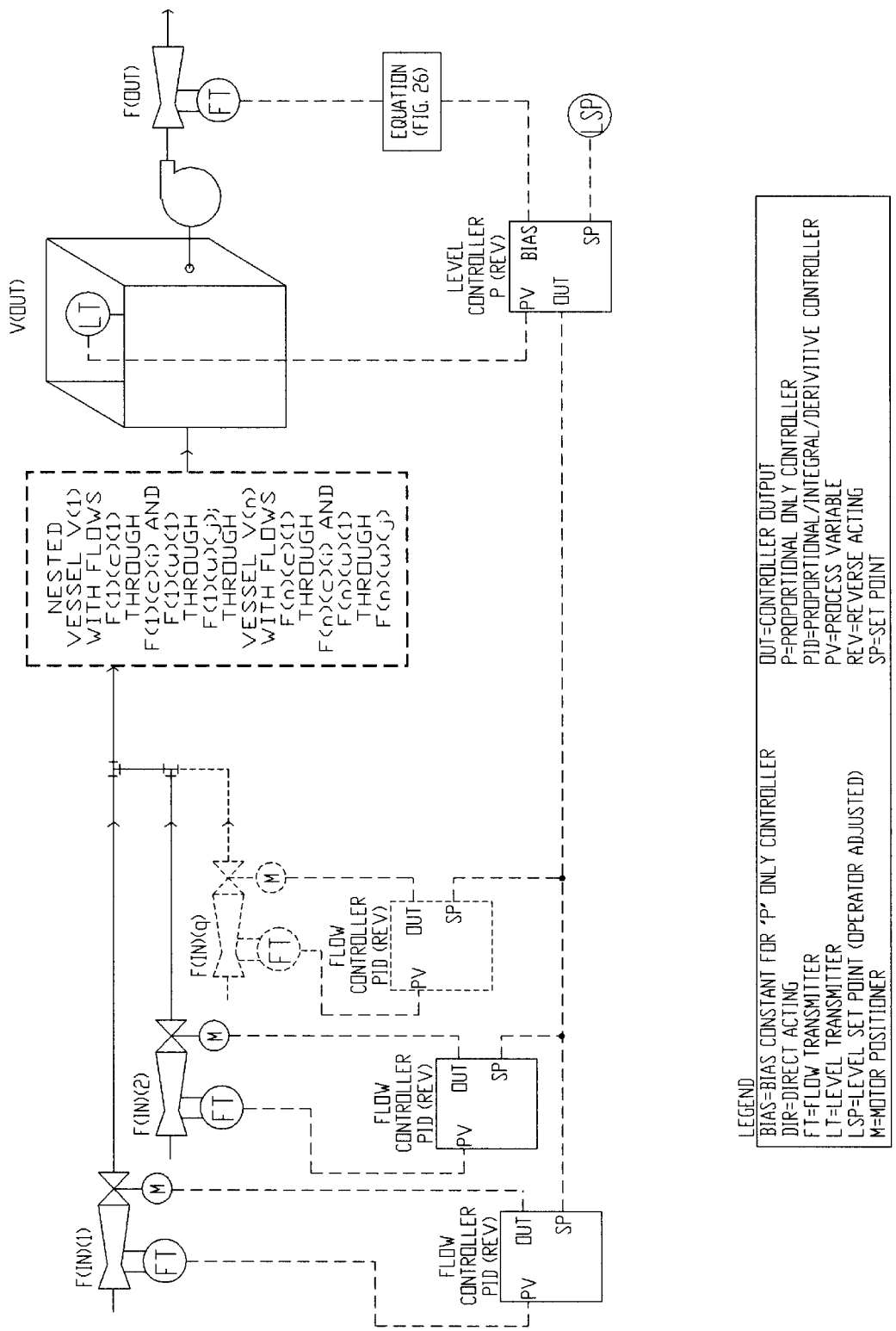
FIG. 21: This is another embodiment of a single "parenthetical" module of the invention.

FIG. 21: This is a single "parenthetical" module of the invention described in FIG. 20 with an added level of versatility. This configuration demonstrates the versatility of the design of the module where there are multiple flow devices providing flow F(IN)(1) through F(IN)(q) into vessel V(1), all of which have flow controllers capable of responding to the level controller (i.e. all "controllable") for V(OUT). The "EQUATION" for this module is shown in FIG. 26. This level controller cascaded to the flow controllers together are termed the "parenthetical" module of the invention because it is used only one time and it is within which one or more "nested" modules of the invention are placed.

Figure 22:
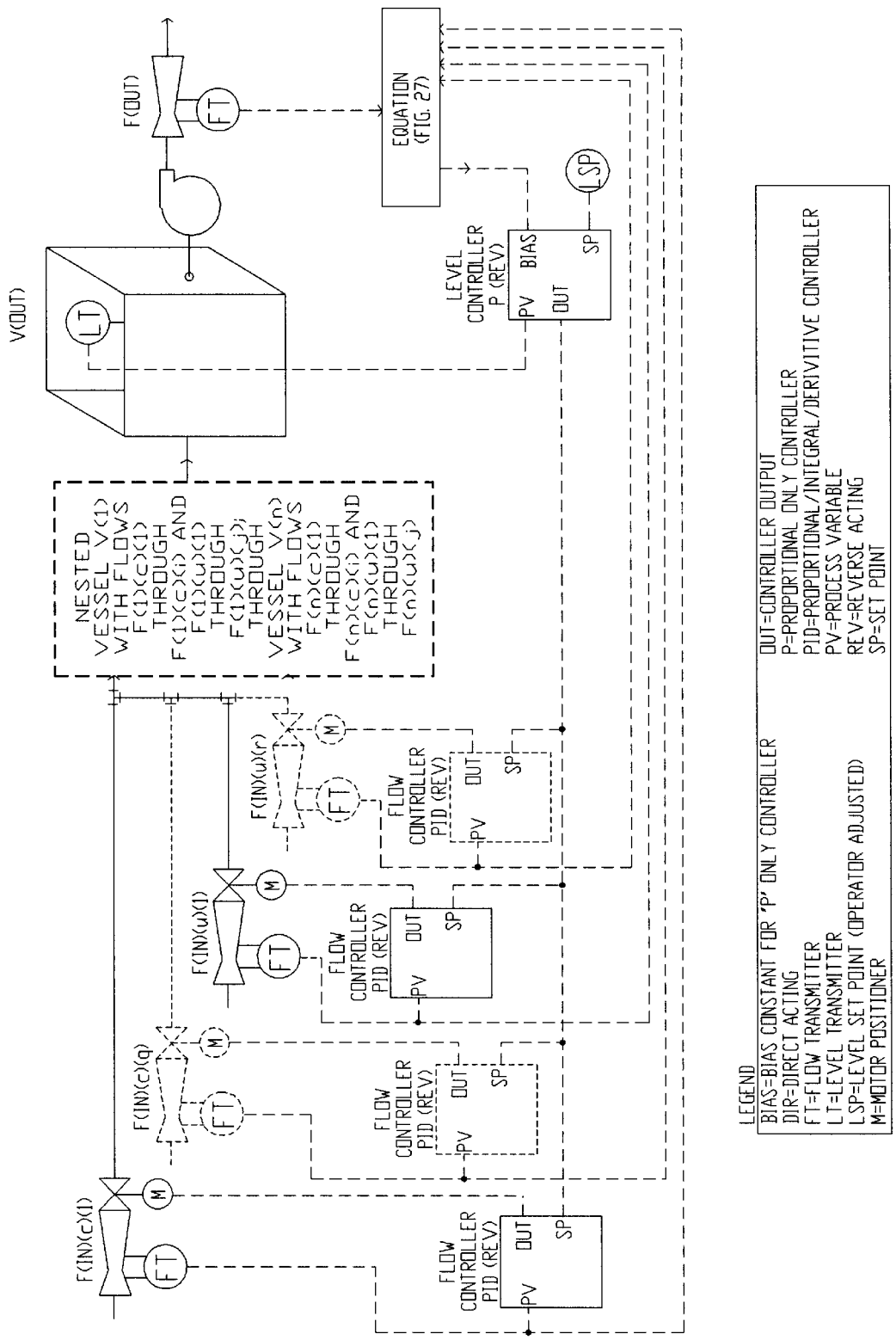
FIG. 22: This is another embodiment of a single "parenthetical" module of the invention.

FIG. 22: This a single "parenthetical" module of the invention described in FIG. 20 with an added level of versatility over that shown in FIG. 21. This configuration demonstrates the versatility of the design of the module where there are multiple flow devices providing flow into vessel V(1), not all of which have flow controllers capable of responding to the level controller for V(OUT). Those flow controllers capable of responding to the level controller (i.e. "controllable") are for flows F(IN)(c)(1) through F(IN)(c)(q). Those flow controllers not capable of responding to the level controller (i.e. "uncontrollable") are for flows F(IN)(u)(1) through F(IN)(u)(r). The "EQUATION" for this module is shown in FIG. 27. This level controller cascaded to the flow controllers together are termed the "parenthetical" module of the invention because it is used only one time and it is within which one or more "nested" modules of the invention are placed.

Figure 23:
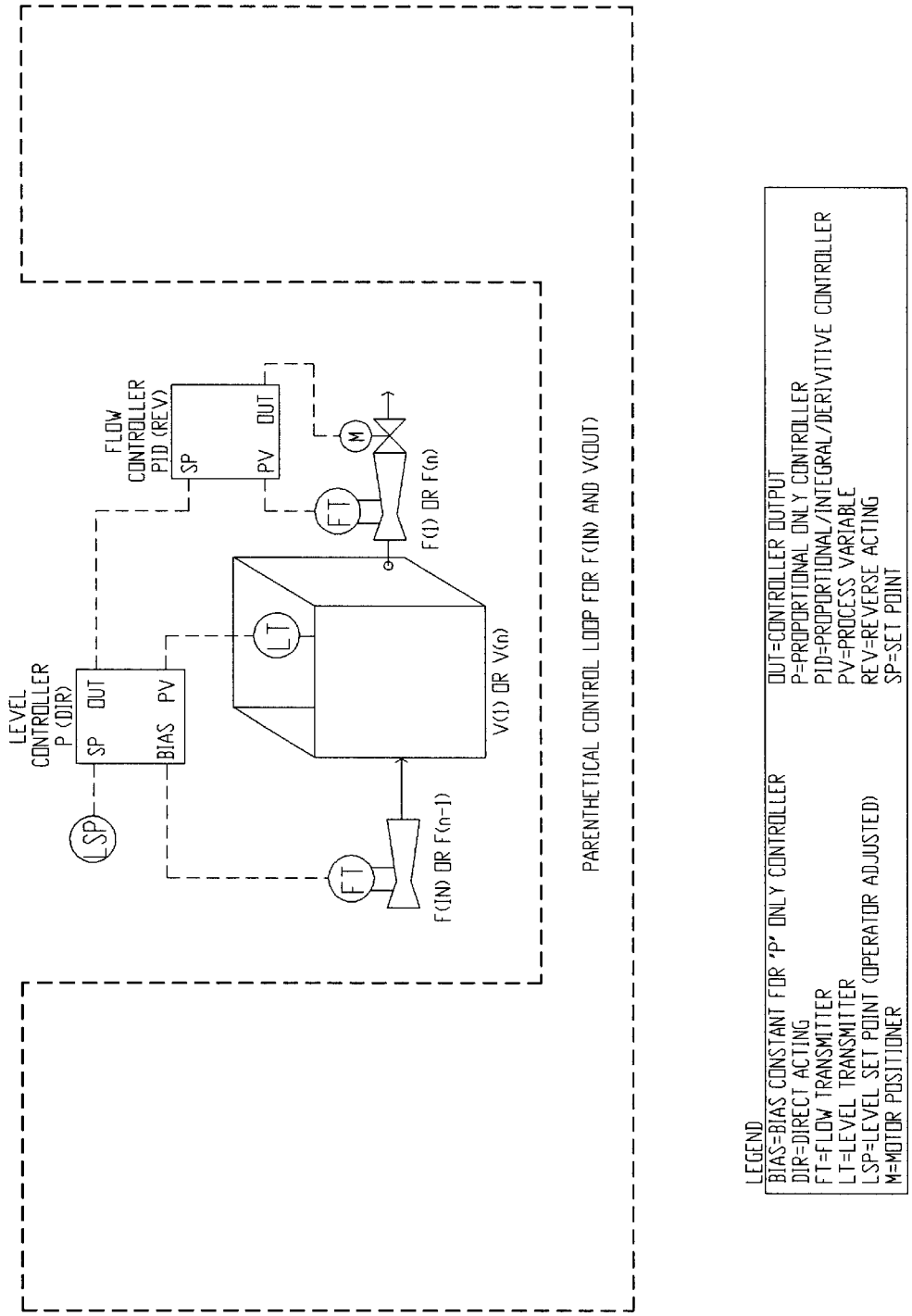
FIG. 23: This is the most basic embodiment of a "nested" module of the invention.

FIG. 23: This is a most basic embodiment of a "nested" module of the invention consisting of a direct acting proportional only level controller for V(1) or V(n) with total flow F(IN) into vessel V(1) or total flow F(n−1) into vessel V(n) used as the bias input and whose output is cascaded to the set point input of a reverse acting proportional/integral/derivative flow controller. The level controller is used for the first vessel V(1) and replicated for successive vessels through and including the next to the last vessel V(n) in a series of vessels. The flow controller regulates the flow F(1) out of the first vessel V(1) in the series of vessels and is replicated for successive vessel outflows through and including the next to the last vessel outflow F(n). The desired levels in V(1) through V(n) are adjusted by the associated operator adjusted set point "LSP". The cascaded level and flow controller for each vessel together are termed the "nested" module of the invention because it is replicated (n) times and it (they) is (are) placed within the single "parenthetical" module of the invention. The parenthetical module of the invention is depicted in FIG. 14, FIG. 15, FIG. 16, FIG. 26, and FIG. 27.

Figure 24:
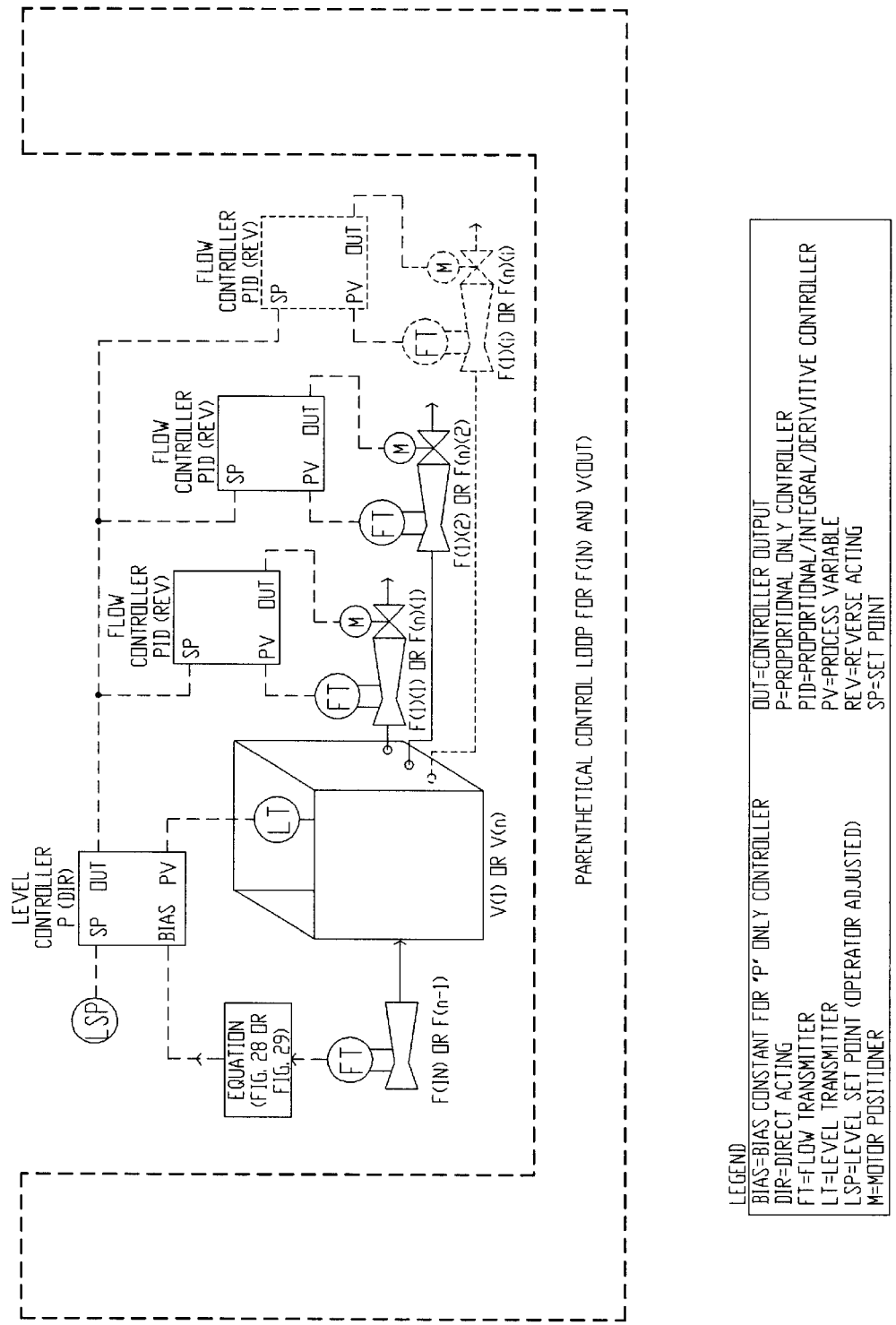
FIG. 24: This is another embodiment of a "nested" module of the invention.

FIG. 24: This is a "nested" module of the invention described in FIG. 23 with an added level of versatility. This configuration demonstrates the versatility of the design of the module for any vessel V(1) with multiple flow controllers for F(1)(1) through F(1)(i), through vessel V(n) with multiple flow controllers for F(n)(1) through F(n)(i), all of which have flow controllers capable of responding to the associated level controller (i.e. all "controllable") for V(1) through V(n). The versatility of the configuration allows varying numbers of flow controllers for vessels V(1) through V(n). For example, there can be three flow controllers for flows F(1)(1) through F(1)(3) for vessel V(1), two flow controllers for flows F(2)(1) and F(2)(2) for vessel V(2), six flow controllers for flows F(3)(1) through F(3)(6) for vessel V(3), one flow controller for flow F(4)(1) for vessel V(4), and so on. The "EQUATIONS" for this module are shown in FIG. 28 and FIG. 29. The cascaded level and flow controller(s) for each vessel together are termed the "nested" module of the invention because it is replicated (n) times (with consideration for the number of flow controllers associated with each vessel) and it (they) is (are) placed within the single "parenthetical" module of the invention.

FIG. 25: This is a "nested" module of the invention described in FIG. 23 with an added level of versatility over that described in FIG. 24. This configuration demonstrates the versatility of the design of the module for any vessel V(1) with multiple flow controllers for F(1)(1) through F(1)(i), through vessel V(n) with multiple flow controllers for F(n)(1) through F(n)(i), not all of which have flow controllers capable of responding to the associated level controller for V(1) through V(n). Those flow controllers capable of responding to their associated level controller (i.e. "controllable") are for flows F(1)(c)(1) through F(1)(c)(i) for vessel V(1) and for flows F(n)(c)(1) through F(n)(c)(i) for vessel V(n). Those flow controllers not capable of responding to their associated level controller (i.e. "uncontrollable") are for flows F(1)(u)(1) through F(1)(u)(o) for vessel V(1) and for flows F(n)(u)(1) through F(n)(u)(i) for vessel V(n). The versatility of the configuration allows varying numbers of controllable and uncontrollable flow controllers for vessels V(1) through V(n). For example, there can be three flow controllers for flows F(1)(c)(1), F(1)(c)(2), and F(1)(u)(1) for vessel V(1); two flow controllers for flows F(2)(c)(1) and F(2)(u)(1) for vessel V(2); six flow controllers for flows F(3)(c)(1), F(3)(c)(2), F(3)(u)(1), F(3)(u)(2), F(3)(u)(3), and F(3)(u)(4) for vessel V(3); one flow controller for flow F(4)(u)(1) for vessel V(4), and so on. The "EQUATIONS" for this module are shown in FIG. 30 and FIG. 31. The cascaded level and flow controller(s) for each vessel together are termed the "nested" module of the invention because it is replicated (n) times (with consideration for the number of controllable and uncontrollable flow controllers associated with each vessel) and it (they) is (are) placed within the single "parenthetical" module of the invention.

FIG. 26: This is a universal equation for the single "parenthetical" module of the invention configuration described in FIG. 21. This equation takes total flow F(OUT) out of vessel V(OUT) and divides by the number "q" representing the total number of "controllable" flow controllers providing flow F(IN)(1) through F(IN)(q) into vessel V(1). The result of this equation provides the bias input to the reverse acting proportional only level controller for V(OUT). Thus, when process variable (LT) and set point (LSP) are equal for V(OUT), the output of the associated level controller serves to provide a set point to the "controllable" flow controllers providing flow F(IN)(1) through F(IN)(q) into vessel V(1) that is equally divided amongst them such that total flow into vessel V(1) is equal to total flow F(OUT) out of vessel V(OUT).

FIG. 27: This is a universal equation for the single "parenthetical" module of the invention configuration described in FIG, 22. This equation takes total flow F(OUT) out of vessel V(OUT) and first subtracts the total flow of those flow controllers not capable of responding to the level controller (i.e. "uncontrollable") for flows F(IN)(u)(1) through F(IN)(u)(r). This result is then divided by the number "q" representing the total number of "controllable" flow controllers providing flow F(IN)(1) through F(IN)(q) into vessel V(I). The result of this equation provides the bias input to the reverse acting proportional only level controller for V(OUT). Thus, when process variable (LT) and set point (LSP) are equal for V(OUT), the output of the associated level controller serves to provide a set point to the "controllable" flow controllers providing flow F(IN)(1) through F(IN)(q) into vessel V(1) that is equally divided amongst them such that total flow into vessel V(1) is equal to total flow F(OUT) out of vessel V(OUT).

FIG. 28: This is a universal equation for the "nested" module(s) of the invention configuration described in FIG. 24 when used for vessel V(1). This equation takes total flow F(IN) into vessel V(1) and divides by the number "i" representing the total number of "controllable" flow controllers providing flow F(1)(1) through F(1)(i) out of vessel V(1). The result of this equation provides the bias input to the direct acting proportional only level controller for V(1). Thus, when process variable (LT) and set point (LSP) are equal for V(I), the output of the associated level controller serves to provide a set point to the "controllable" flow controllers providing flow F(1)(1) through F(1)(i) out of vessel V(1) that is equally divided amongst them such that total flow out of vessel V(1) is equal to total flow F(IN) into vessel V(1).

FIG. 29: This is a universal equation for the "nested" module(s) of the invention configuration described in FIG. 24 when used for vessel V(n). This equation takes total flow F(n−1) into vessel V(n) and divides by the number "i" representing the total number of "controllable" flow controllers providing flow F(n)(1) through F(n)(i) out of vessel V(n). The result of this equation provides the bias input to the direct acting proportional only level controller for V(n). Thus, when process variable (LT) and set point (LSP) are equal for V(n), the output of the associated level controller serves to provide a set point to the "controllable" flow controllers providing flow F(n)(1) through F(n)(i) out of vessel V(n) that is equally divided amongst them such that total flow out of vessel V(n) is equal to total flow F(n−1) into vessel V(n).

FIG. 30: This is a universal equation for the "nested" module(s) of the invention configuration described in FIG. 25 when used for vessel V(1). This equation takes total flow F(IN) into vessel V(1) and first subtracts the total flow of those flow controllers not capable of responding to the level controller (i.e. "uncontrollable") for flows F(1)(u)(1) through F(1)(u)j). This result is then divided by the number "i" representing the total number of "controllable" flow controllers providing flow F(1)(c)(1) through F(1)(c)(i) out of vessel V(1). The result of this equation provides the bias input to the direct acting proportional only level controller for V(1). Thus, when process variable (LT) and set point (LSP) are equal for V(1), the output of the associated level controller serves to provide a set point to the "controllable" flow controllers providing flow F(1)(c)(1) through F(1)(c)(i) out of vessel V(1) that is equally divided amongst them such that total flow into vessel V(1) is equal to total flow out of vessel V(1).

FIG. 31: This is a universal equation for the "nested" module(s) of the invention configuration described in FIG. 25 when used for vessel V(n). This equation takes total flow F(n−1) into vessel V(n) and first subtracts the total flow of those flow controllers not capable of responding to the level controller (i.e. "uncontrollable") for flows F(n)(u)(1) through F(n)(u)j). This result is then divided by the number "i" representing the total number of "controllable" flow controllers providing flow F(n)(c)(1) through F(n)(c)(i) out of vessel V(n). The result of this equation provides the bias input to the direct acting proportional only level controller for V(n). Thus, when process variable (LT) and set point (LSP) are equal for V(n), the output of the associated level controller serves to provide a set point to the "controllable" flow controllers providing flow F(n)(c)(1) through F(n)(c)(i) out of vessel V(n) that is equally divided amongst them such that total flow into vessel V(n) is equal to total flow out of vessel V(n).

FIG. 32: This is the generally accepted equation for the calculated error of a conventional direct acting proportional only or proportional/integral/derivative process controller used by the invention.

FIG. 33: This is the generally accepted equation for the calculated error of a conventional reverse acting proportional only or proportional/integral/derivative process controller used by the invention.

FIG. 34: This is the generally accepted equation for a conventional proportional only process controller used by the invention.

FIG. 35: This is the generally accepted equation for a conventional proportional/integral/derivative process controller used by the invention. As shown, the derivative constant is zero and, so, the derivative contribution is not shown. This is only done for simplification and the fact that a non-zero derivative term is desired or required so as to be ultimately responsive to the system dynamics has no detrimental effect on the function of the invention.

OPERATION OF THE INVENTION

The previously described modules described in FIG. 20, FIG. 21, FIG. 22, FIG. 23, FIG. 24, and FIG. 25 are now applied to a specific example. The universal equations previously described in FIG. 26, FIG. 27, FIG. 28, FIG. 29, FIG. 30, and FIG. 31 have been specifically applied to the example system depicted in FIG. 39 and FIG. 39A and result in the equations shown in FIG. 36, FIG. 37, and FIG. 38. The description that follows is in order of the figure nomenclature.

Figure 39:
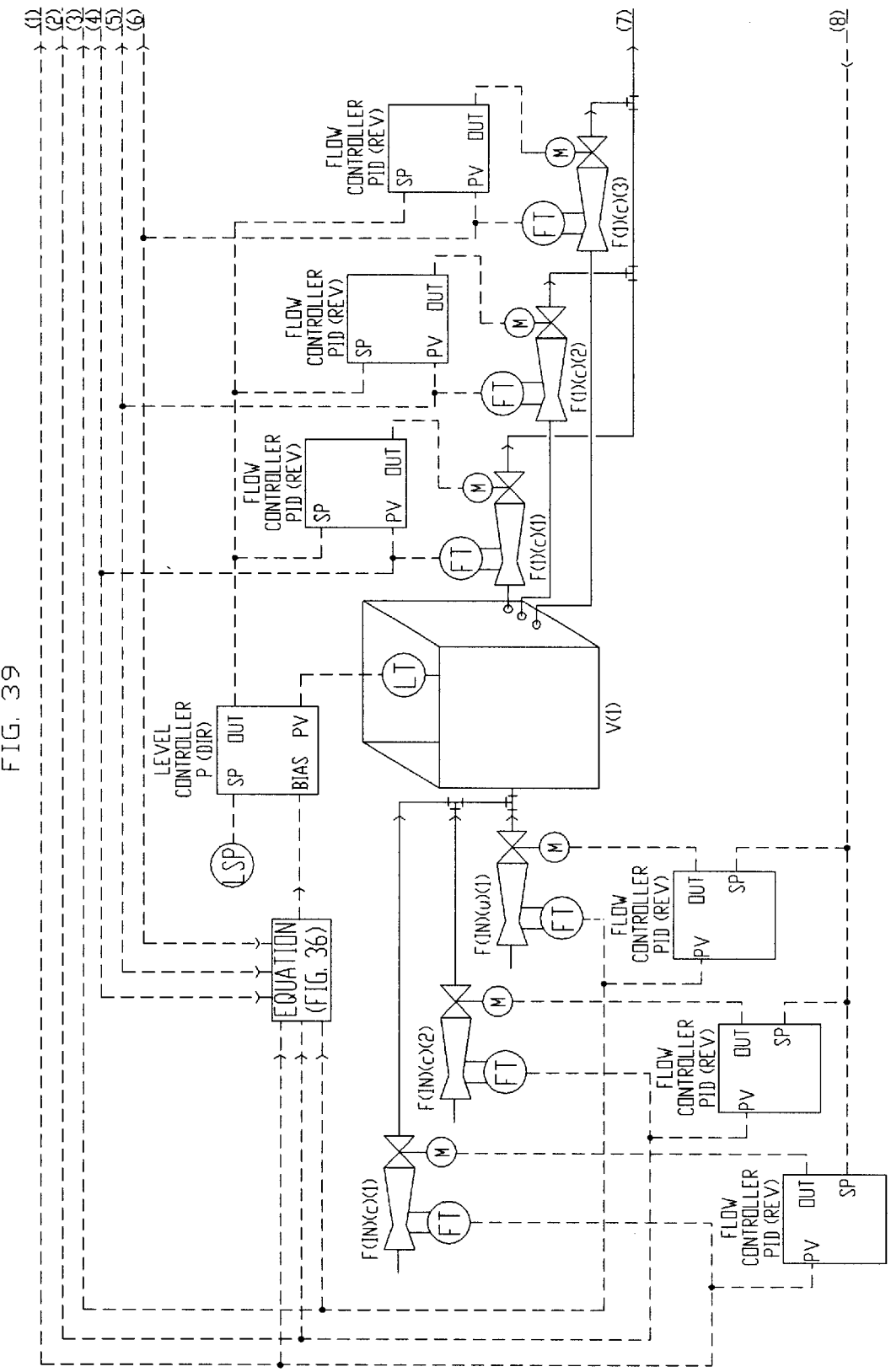
FIG. 39: This in conjunction with FIG. 39A is an example of a system with three vessels V(1), V(2), and V(OUT) to which the single "parenthetical" module and the "nested" modules of the invention are applied

FIG. 36: This is the equation for the first "nested" module of the invention as applied to the example system configuration for vessels V(1), V(2), and V(OUT) shown in FIG. 39 and FIG. 39A. The first nested module configuration for vessel V(1) as shown on FIG. 39 is developed from that described in FIG. 25 such that both "controllable" as well as "uncontrollable" flow controller flow signals for all F(1) series flows are monitored so that the system dynamics can be accommodated. For example, while in this instance as statically depicted all three flow controllers receiving the cascaded set point from the associated level controller output are "controllable", the equation must be able to accommodate the associated dynamics where one or more of these F(1) flow controllers may change back and forth from/to "controllable" and "uncontrollable" states by continuously monitoring their "controllable" and "uncontrollable" flows and states, thereby changing the resultant bias calculation for the level controller. The equation as shown, however, is the result as statically depicted for three "controllable" flow controllers F(1)(c)(1), F(1)(c)(2), and F(1)(c)(3).

Figure 39A:
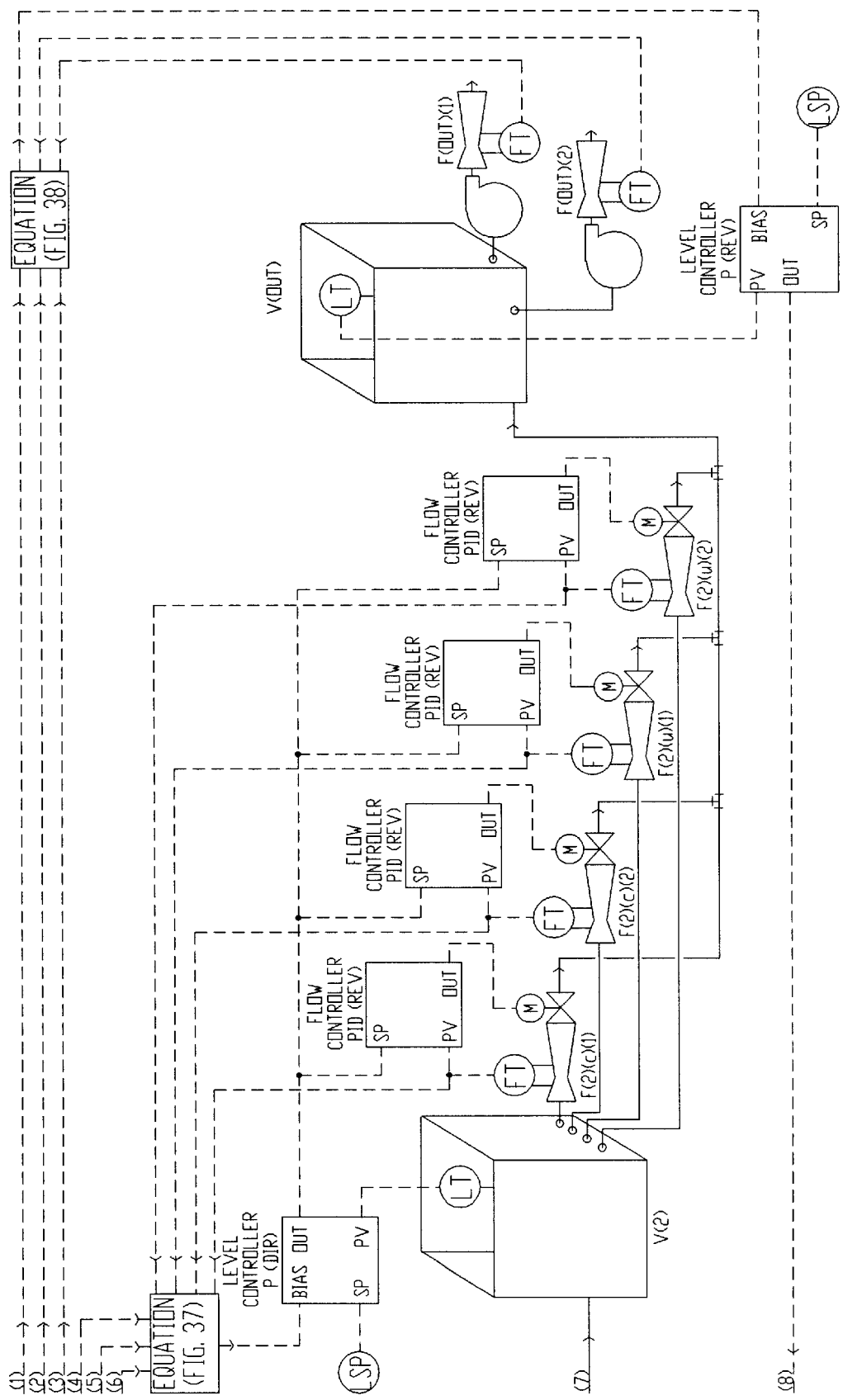
FIG. 39A: This in conjunction with FIG. 39 is an example of a system with three vessels V(1), V(2), and V(OUT) to which the single "parenthetical" module and the "nested" modules of the invention are applied

FIG. 37: This is the equation for the second "nested" module of the invention as applied to the example system configuration for vessels V(1), V(2), and V(OUT) shown in FIG. 39 and FIG. 39A. The second nested module configuration for V(2) as shown on FIG. 39 and FIG. 39A is developed from that described in FIG. 25 such that both "controllable" as well as "uncontrollable" flow controller flow signals for all F(2) series flows are monitored so that the system dynamics can be accommodated. For example, while in this instance as statically depicted there are only two "controllable" flow controllers and two "uncontrollable" flow controllers, all of these F(2) series flow controllers receive the cascaded set point from the associated level controller output. In this respect, the equation is able to accommodate the associated dynamics where one or more of these F(2) controllers may change back and forth from/to "controllable" and "uncontrollable" states by continuously monitoring their "controllable" and "uncontrollable" flows and states, thereby changing the resultant bias calculation for the level controller. The equation as shown, however, is the result as statically depicted for two "controllable flow controllers F(2)(c)(1) and F(2)(c)(2), and two "uncontrollable" flow controllers F(3)(u)(1) and F(3)(u)(2).

FIG. 38: This is the equation for the single "parenthetical" module of the invention as applied to the example system configuration for vessels V(1), V(2), and V(OUT) shown in FIG. 39 and FIG. 39A. The single parenthetical module configuration for V(OUT) as shown on FIG. 39 and FIG. 39A is developed from that described in FIG. 22 such that both "controllable" as well as "uncontrollable" flow controller flow signals for all F(IN) series flows are monitored so that the system dynamics can be accommodated. For example, while in this instance as statically depicted there are two "controllable" flow controllers and one "uncontrollable" flow controller, all of these F(IN) series flow controllers receive the cascaded set point from the associated level controller output. In this respect, the equation is able to accommodate the associated dynamics where one or more of these F(IN) series controllers may change back and forth from/to "controllable" and "uncontrollable" states by continuously monitoring their "controllable" and "uncontrollable" flows and states, thereby changing the resultant bias calculation for the level controller. The equation as shown, however, is the result as statically depicted for three flow controllers F(IN)(c)(1), F(IN)(c)(2), and F(IN)(u)(1).

FIG. 39: This in conjunction with FIG. 39A is an example of a system with three vessels V(1), V(2), and V(OUT) to which the single "parenthetical" module and the "nested" modules of the invention are applied. This demonstrates the universal applicability of the "parenthetical" and "nested" modules and associated equations of the invention. Match line nomenclature 1 through 8 shown in parenthesis at the far right of FIG. 39 match up with the same nomenclature shown at the far left of FIG. 39A.

FIG. 39A: This in conjunction with FIG. 39 is an example of a system with three vessels V(1), V(2), and V(OUT) to which the single "parenthetical" module and the "nested" modules of the invention are applied. This demonstrates the universal applicability of the "parenthetical" and "nested" modules and associated equations of the invention. Match line nomenclature 1 through 8 shown in parenthesis at the far left of FIG. 39A match up with the same nomenclature shown at the far right of FIG. 39.

Figure 40:
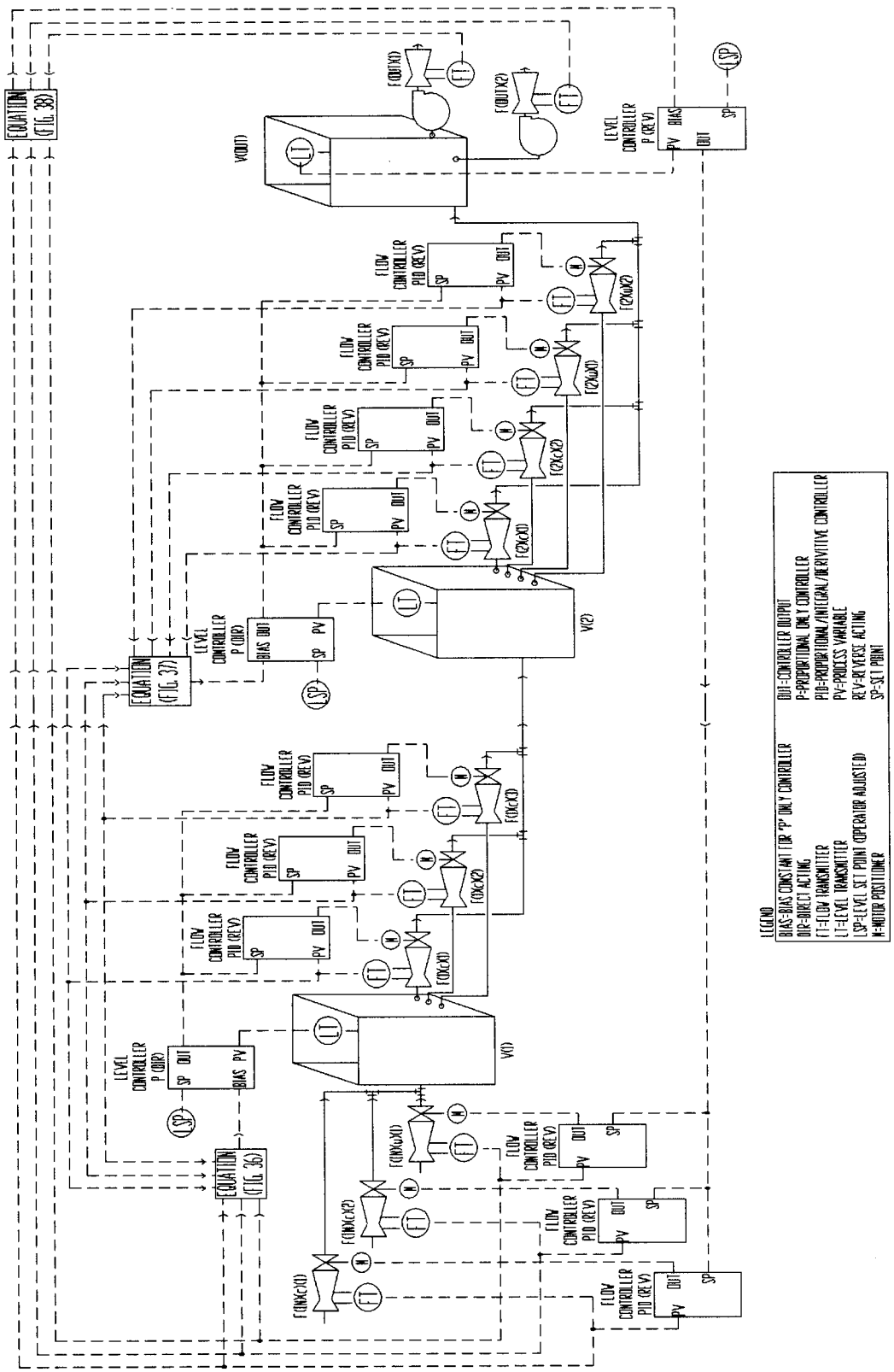
FIG. 40: This is a combination of FIG. 39 and FIG. 39A depicting an overall view of the example system with three vessels V(1), V(2), and V(OUT) to which the single "parenthetical" module and the multiple "nested" modules of the invention are applied.

FIG. 40: This is a combination of FIG. 39 and FIG. 39A depicting an overall view of the example system with three vessels V(1), V(2), and V(OUT) to which the single "parenthetical" module and the multiple "nested" modules of the invention are applied.

The previously described modules described in FIG. 20, FIG. 21, FIG. 22, FIG. 23, FIG. 24, and FIG. 25 with the associated universal equations previously described in FIG. 26, FIG. 27, FIG. 28, FIG. 29, FIG. 30, and FIG. 31 are now applied to the typical water treatment plant shown in FIG. 1 as a second example. Proper application of the invention first requires an understanding of the process dynamics. In this application, there is not a flow manipulation device between the sedimentation basins and the filters. Filter flume level is typically monitored, but sedimentation basin level is typically not monitored. Common sense indicates that the flow pumped into the sedimentation basins will equal the flow into the filters. Thus, the summation of raw water flow and spent backwash flow is F(IN) into the filter influent flume, V(1). While filter backwash flow enters the filters, it exits to the spent backwash basin and is, therefore, not considered to be a part of F(IN) until spent backwash flow enters the sedimentation basins. The last vessel, V(OUT) is the clearwell. Total flow F(OUT) out of V(OUT) will be the summation of plant effluent flow and filter backwash flow.

The next level of understanding of the process dynamics that is necessary for proper application of the invention requires the identification of "controllable" as well as "uncontrollable" flow controllers. As defined previously, those PID flow controllers capable of responding to the set point input from their associated level controller output are "controllable". Those PID flow controllers not capable of responding to the set point input from their associated level controller output are "uncontrollable". When applying the invention it is necessary to determine which flow controllers could and should be able to respond to the prospective level controller output.

In this example, the plant design dictates that sedimentation basin flow is adjusted by its operator manipulated flow set point, FSP, separate from a prospective output from the V(OUT) level controller. This is due to the fact that an understanding of the process indicates that the sedimentation basin is not a constant or consistent water source. This is because backwashes are not continuously performed. So, most designs provide for the sedimentation basin to be drained at a relatively low flow rate (operator adjusted) when a predetermined high level is reached. Thus, in this case this flow controller is permanently "uncontrollable". Knowledge of the plant process also dictates that backwash water flow is adjusted by its operator manipulated flow set point, FSP. This is of no concern from a "controllability" or "uncontrollability" standpoint since the invention with regard to V(OUT) concerns itself only with the monitoring of flow rates out of V(OUT) and not the control of these flow rates.

The plant design indicates that the raw water flow controller and the three filter effluent flow controllers have access to a constant or consistent water source. Thus, these are the "controllable" flow controllers to which the invention is to be applied. However, an understanding of the process indicates that the filter effluent flow controllers are not always in the "controllable" state. For example, a filter flow controller is in the "uncontrollable" state when the filter is backwashing, when the filter is off line or shut down, when the associated motorized valve operator is in the local mode not capable of responding to the PID flow controller output, or other criteria. Thus, as for the previous example EQUATIONS (as described in FIG. 36, FIG. 37, and FIG. 38), when properly developing and applying the universal EQUATION for the "parenthetical" module (FIG. 27) and the "nested" module (FIG. 30 or FIG. 31), all criteria dictating "uncontrollable" state must be monitored to insure that the result appropriately responds to the changing "controllable" and "uncontrollable" state dynamics.

Based upon the process understanding described above, the system configuration depicted in FIG. 41 and FIG. 41A results from the combination of the "parenthetical" module of the invention shown in FIG. 22 and a single "nested" module of the invention shown in FIG. 25 when properly applying the invention. The appropriate EQUATION for the single "nested" module is that depicted in FIG. 30 since it applies to V(1). To insure the appropriate numerical operation, configuration, and understanding of the universal EQUATION for the "nested" module as referenced in FIG. 30, example flow rates and scenarios are as follows:

1) Assume that all previously described specific examples of filter flow controller "uncontrollable" criteria and states are monitored, that F(IN)(c)(1) is 10 MGD, F(IN)(u)(1) is 1 MGD, and all three filter flow controllers F(1)(c)(1), F(1)(c)(2) and F(1)(c)(3) are "controllable". The result of the universal FIG. 30 EQUATION providing the bias input to the level controller for the filter influent flume V(1) would be (10 MGD+1 MGD)/3=3.667 MGD.

2) Assume that all previously described specific examples of filter flow controller "uncontrollable" criteria and states are monitored, that F(IN)(c)(1) is 10 MGD, F(IN)(u)(1) is 1 MGD, two filter flow controllers F(1)(c)(1), F(1)(c)(2) are "controllable", and F(1)(c)(3) changes to F(1)(u)(3) and is "uncontrollable" due to the fact that operations personnel has switched it to the local manual mode and it has a flow rate of 3 MGD. The result of the universal FIG. 30 EQUATION providing the bias input to the level controller for the filter influent flume V(1) would be (10 MGD+1 MGD−3 MGD)/2=4 MGD.

To insure the appropriate numerical operation, configuration, and understanding of the universal EQUATION for the "parenthetical" module as referenced in FIG. 27, example flow rates and scenarios are as follows:

1) Assume that F(OUT)(1) is 10 MGD, F(OUT)(2) is 0 MGD, and F(IN)(u)(1) is 1 MGD. The result of the universal FIG. 27 EQUATION providing the bias input to the level controller for the clearwell V(OUT) would be (10 MGD+0 MGD−1 MGD)/1=9 MGD.

2) Assume that F(OUT)(1) is 10 MGD, F(OUT)(2) is 5 MGD because a filter backwash is in progress, and F(IN)(u)(1) is 1 MGD. The result of the universal FIG. 27 EQUATION providing the bias input to the level controller for the clearwell V(OUT) would be (10 MGD+5 MGD−1 MGD)/1=14 MGD.

Figure 41:
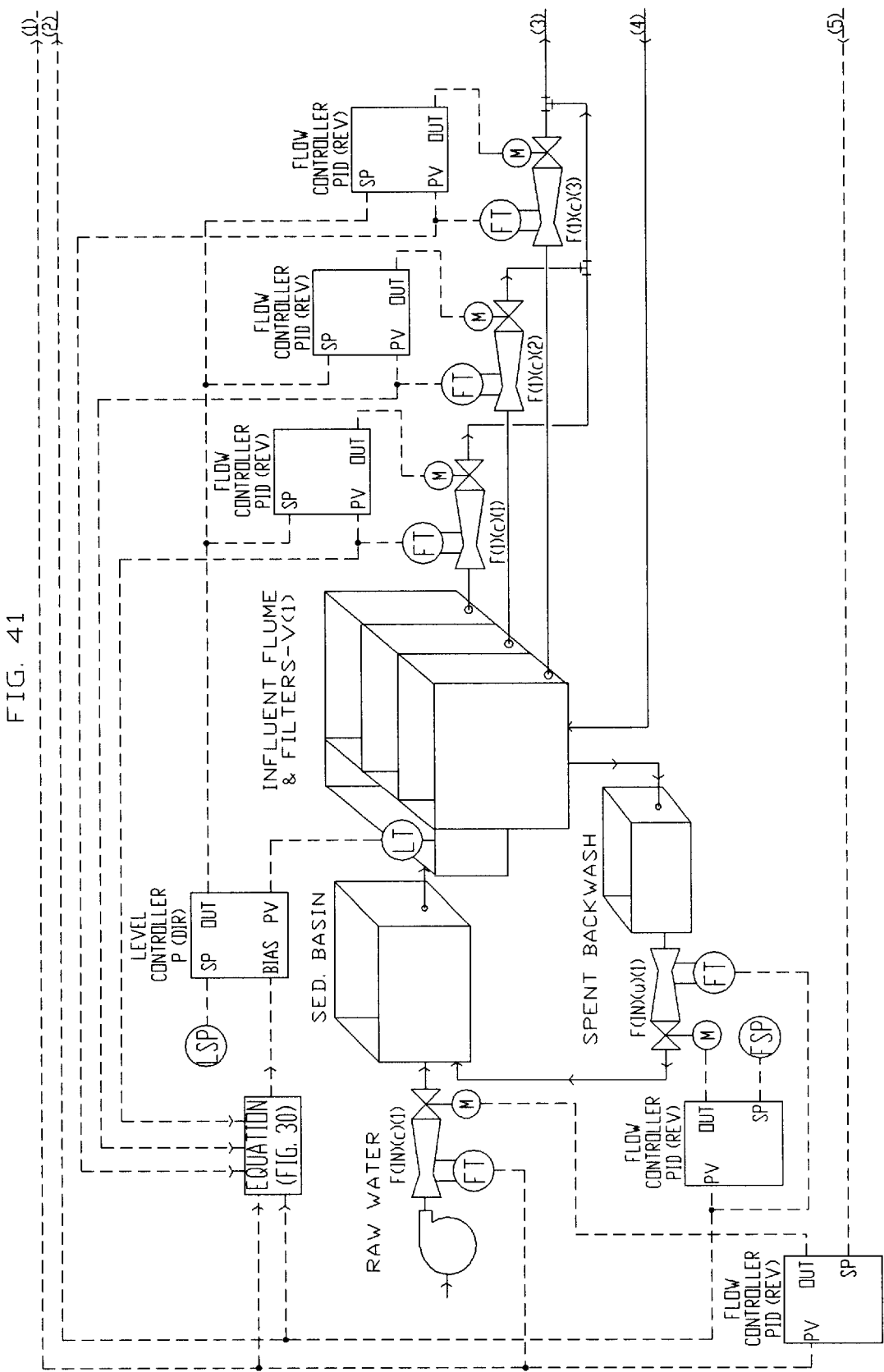
FIG. 41: This in conjunction with FIG. 41A is an example of a system with two vessels V(1) and V(OUT) to which the single "parenthetical" module and the "nested" module of the invention are applied
Figure 41A:
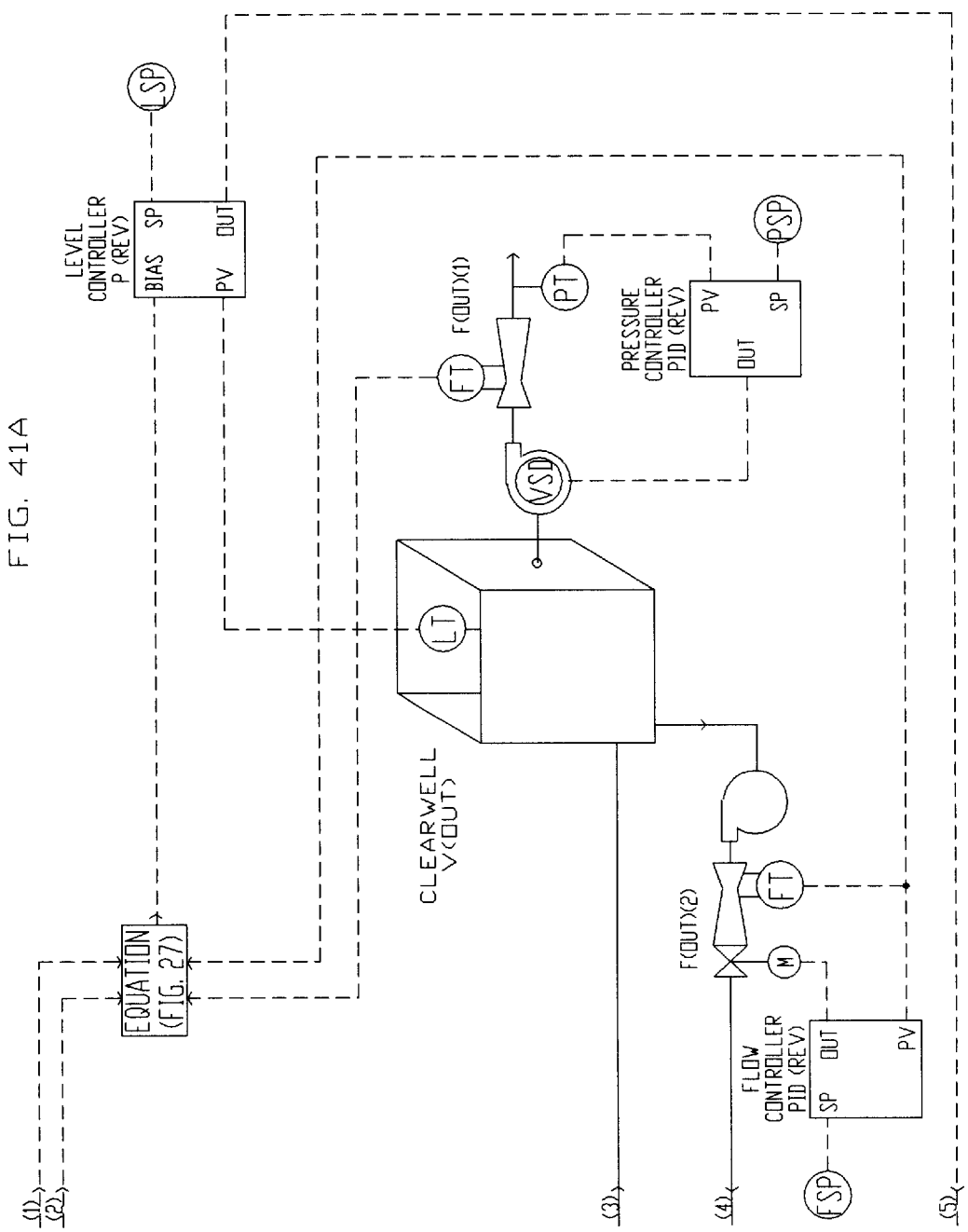
FIG. 41A: This in conjunction with FIG. 41 is an example of a system with two vessels V(1) and V(OUT) to which the single "parenthetical" module and the "nested" module of the invention are applied
Figure 42:
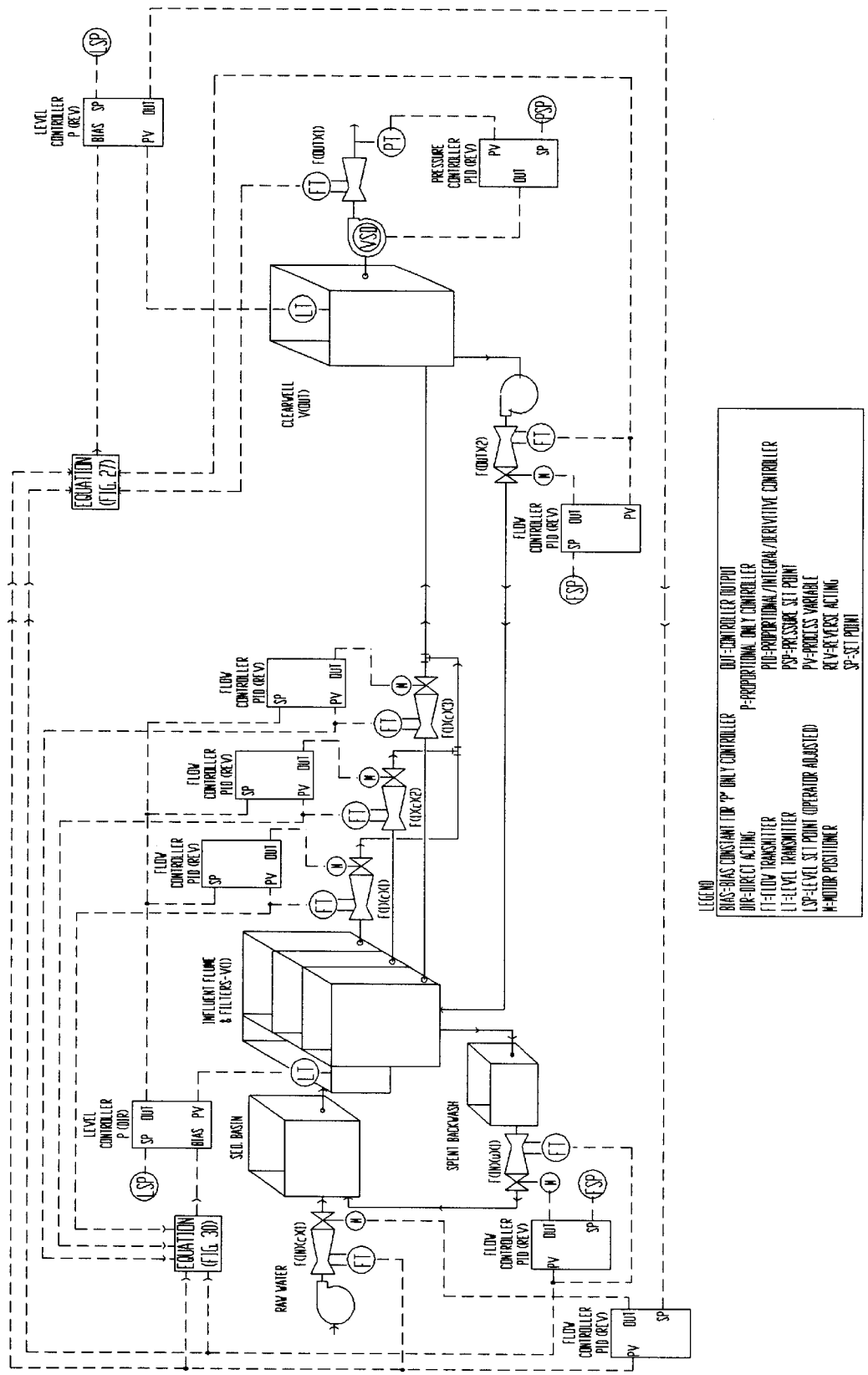
FIG. 42: This is a combination of FIG. 41 and FIG. 41A depicting an overall view of the example system with two vessels V(1) and V(OUT) to which the single "parenthetical" module and the "nested" modules of the invention are applied.

FIG. 42 is a combination of FIG. 41 and FIG. 41A depicting an overall view of the typical water treatment plant example system with two vessels V(1) and V(OUT) to which the single "parenthetical" module and the single "nested" modules of the invention are applied.

Figure 14:
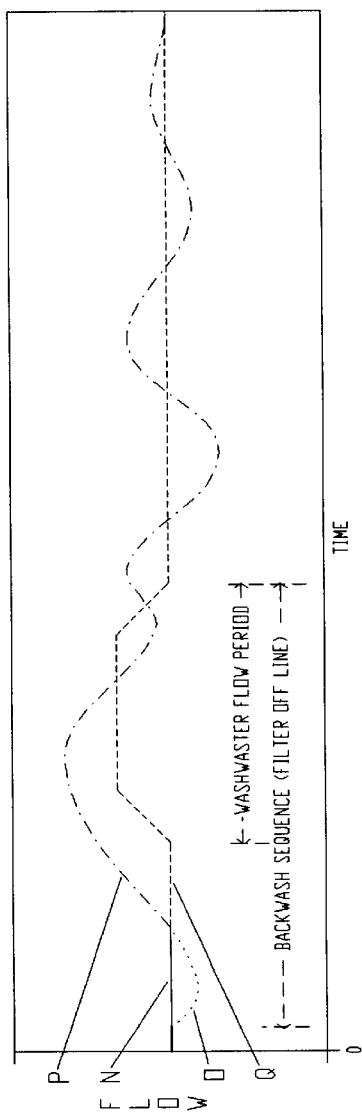
FIG. 14: Prior art depiction of the flow into the clearwell as contrasted to the effective total plant effluent flow over time for a cascaded direct acting proportional/integral/derivative flume level controller in conjunction with a cascaded reverse acting proportional/integral/derivative clearwell level controller.

FIG. 43 depicts the resultant system dynamics enjoyed by the typical water treatment plant example to which the invention is applied as described previously in FIG. 41 and FIG. 41A. The thickened portions of the waveforms show waveforms "Z" and "AA" lying on top of each other and an otherwise steady state condition. Waveform "Z" is a depiction of the flow into the clearwell (i.e. out of the filters) while waveform "AA" is the effective total plant effluent flow over time. The overall accomplishment of an objective of the invention to minimize filter flow rate fluctuations can be realized by contrasting these waveforms shown in FIG. 43 to that which has been able to be accomplished by the prior art as depicted in FIG. 14 and FIG. 17. Given the exact same disturbance for the increase in effective total plant effluent flow out of the clearwell as a result of the filter backwash process depicted by these figures, a dramatic difference is demonstrated by the resultant waveform "Z" produced by the invention and the comparative oscillatory and offset waveforms of the prior art.

Figure 15:
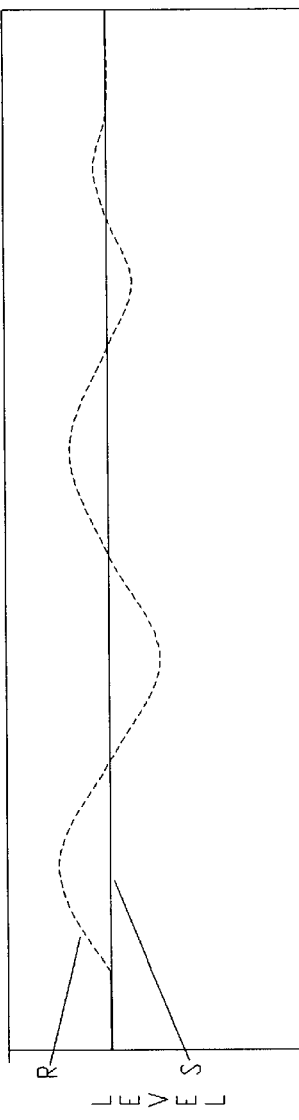
FIG. 15: Prior art depiction of the level in the flume or filters over time as contrasted to the flume level set point as a result of a cascaded direct acting proportional/integral/derivative flume level controller in conjunction with a cascaded reverse acting proportional/integral/derivative clearwell level controller.
Figure 16:
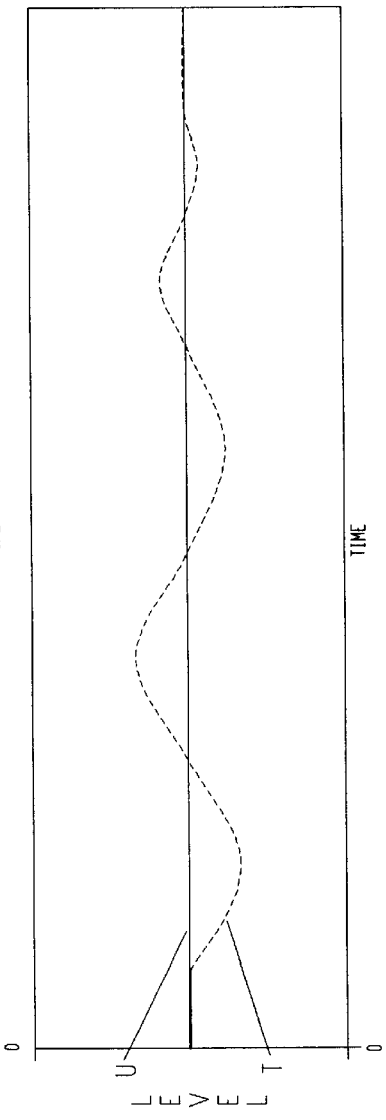
FIG. 16 Prior art depiction of the level in the clearwell over time as contrasted to the clearwell level set point as a result of a cascaded direct acting proportional/integral/derivative flume level controller in conjunction with a cascaded reverse acting proportional/integral/derivative clearwell level controller.

The response of the associated flume level (waveform "BB") and clearwell level (waveform "CC") as shown in FIG. 44 are enjoyed by the typical water treatment plant example to which the invention is applied as described previously in FIG. 41 and FIG. 41A. The overall accomplishment of an objective of the invention to maintain levels (especially clearwell level) can be realized by contrasting these waveforms shown in FIG. 44 to that which has been able to be accomplished by the prior art waveform "R" and waveform "T" for flume level and clearwell level response as depicted in FIG. 15, FIG. 1 and FIG. 18. Given the exact same disturbance for the increase in effective total plant effluent flow out of the clearwell as a result of the filter backwash process, a dramatic difference is demonstrated by the resultant waveform "BB" and waveform "CC" produced by the invention and the comparative oscillatory and offset waveforms of the prior art.

The resultant outputs to the respective filter effluent flow control valve positioners for the remaining filters not being backwashed, (waveform "DD") and the speed demand output to the variable speed pump drive for the system pressure controller (waveform "EE") as shown in FIG. 45 are enjoyed by the typical water treatment plant example to which the invention is applied as described previously in FIG. 41 and FIG. 41A. The overall accomplishment of an objective of the invention to minimize wear and tear on flow manipulating equipment can be realized by contrasting these waveforms shown in FIG. 45 to that which has been able to be accomplished by the prior art waveform "V" and waveform "X" for the same variables as depicted in FIG. 19. Given the exact same disturbance for the increase in effective total plant effluent flow out of the clearwell as a result of the filter backwash process, a dramatic difference is demonstrated by the resultant waveform "BB" and waveform "CC" produced by the invention and the comparative oscillatory and offset waveforms of the prior art.

The overall accomplishment of the additional objective to reveal flow measuring device inaccuracies is realized when a consistent offset exists during steady state conditions between measured level and set point level for a given vessel or reservoir. So, for the typical water treatment plant example described previously in FIG. 41 and FIG. 41A, if an offset exists in the filter influent flume, V(1), this reveals a calibration error between the raw water and spent backwash F(IN) flow measuring and transmitting devices as compared to the filter effluent F(1) flow measuring and transmitting devices. Similarly, if an offset exists in the clearwell, V(OUT), this reveals a calibration error between the filter effluent F(1) flow measuring and transmitting devices as compared to the high service and backwash F(OUT) flow measuring and transmitting devices. The difference between total measured inflow and total measured outflow of a particular vessel or reservoir indicates the degree of inaccuracy associated with the pertinent flow measuring and transmitting devices during steady state conditions.

The reason the calibration discrepancy objective is realized is due to the structure of the universal EQUATION shown in FIG. 26 through FIG. 31. Since part of the invention componentry is one or a number of these dynamic equations, the output of which provides the bias input to the respective proportional only level controller for the vessel or reservoir as discussed previously, and the equation result is predicated upon the measurement of the respective vessel or reservoir inflows and outflows, calibration discrepancies if they exist are readily discovered. When levels are at desired set points, and all flow measuring instruments are appropriately calibrated, the flow and level control system is perfectly balanced.

The foregoing functional description specifically drafted to address the first embodiment of the invention has concerned itself with the general use of the "parenthetical" and "nested" modules of the invention applied to a process (such as a water treatment plant) where it is desired to be responsive to outflow demand of the last vessel or reservoir in the series. The invention when applied to a process (such as a wastewater treatment plant) where it is desired to be responsive to the inflow to the first vessel or reservoir in the series is the subject of the second embodiment of the invention and described below.

All functional descriptions and associated figures previously described for the first embodiment of the invention are applicable to the second embodiment of the invention except that which concerns itself with the use of the "parenthetical" module as described in FIG. 20, FIG. 21, FIG. 22, FIG. 26, and FIG. 27. Thus, the invention when applied to a process where it is desired to be responsive to the inflow to the first vessel or reservoir in the series uses only the "nested" module. Flow regulation out of all vessels or reservoirs in the series is accomplished utilizing as many replications as necessary of this "nested" module consisting of a level controller whose output is cascaded forward to the flow controller(s) for the flow out of such vessel or reservoir in the series. The flow into the first vessel or reservoir in the series responds to system demand criteria and it is this flow and level to which the invention the second embodiment of the invention is ultimately responsive.

All flows (except the flow into the first vessel or reservoir in the series) are regulated in a manner that eliminates flow and level oscillation, minimizes flow rate changes, minimizes the manipulation and associated wear and tear of flow control devices, reveals flow measurement calibration discrepancies, and provides ultimate system responsiveness by anticipating system disturbances or changes in demand and implementing corrective measures in advance of levels deviating from their respective set points. All these objectives are realized in the second embodiment of the invention for the same reasons they are realized for the first embodiment of the invention.

CONCLUSION, RAMIFICATIONS, AND SCOPE

As can be seen from above my invention does accomplish its objectives for a system of a plurality of reservoirs or vessels connected by pipeline or open channel in which flow measuring and manipulating devices are placed. It regulates flows in a manner that eliminates flow and level oscillation. It minimizes flow rate changes and minimizes the manipulation and associated wear and tear of flow control devices. It reveals flow measurement calibration discrepancies. It provides ultimate system responsiveness by anticipating system disturbances or changes in demand and implementing corrective measures in advance of levels deviating from their respective set points.

While the above description for each claim contains many specificities, these should not be construed as limitations on the scope of the invention, but rather as exemplifications of certain embodiments thereof Other variations are possible and available. One example is that, although the invention has discussed the manipulation through the universal EQUATIONS described in FIG. 26 through FIG. 31 and has shown the particular result as the bias input to the pertinent proportional only level controller, it is only necessary that the set point to the "controllable" PID flow controller(s) associated with the particular "parenthetical" and "nested" modules is a function of the associated vessel or reservoir inflow and outflow such that when measured level is at desired set point, inflow and outflow demand set points are equal.

Another example is that, although the invention application examples discuss that flow to "controllable" flow controllers is to be evenly ratioed, this is not to limit the scope of use of the invention to structure the EQUATIONS described in FIG. 26 through FIG. 31 so as to prohibit an imbalanced division of flow amongst the "controllable" flow controllers within the individual "parenthetical" or "nested" modules. Again, it is only necessary that the set point to the "controllable" PID flow controller(s) associated with the particular "parenthetical" and "nested" modules is a function of the associated vessel or reservoir inflow and outflow such that when measured level is at desired set point, inflow and outflow demand set points are equal.

Accordingly, the scope of the invention should not be limited by the embodiment(s) illustrated, but should include the appended claims and their legal equivalents.

What is claimed is:

1. In a liquid flow system comprising a plurality of reservoirs connected in series by pipelines or open channels including at least one first reservoir ($V_1$) and a last reservoir ($V_{OUT}$) downstream from said at least one first reservoir, said at least one first reservoir including a level sensor, at least one inflow and at least one outflow, each said inflow and outflow including a flow manipulation device and a flow measuring device, said last reservoir ($V_{OUT}$) including a level sensor and at least one outflow having a flow measuring device, the improvement comprising a nested and cascaded variable bias feedforward and feedback flow and level control system for maintaining liquid levels in said reservoirs while substantially eliminating flow and level oscillations, said control system comprising the following:

(a) a parenthetical control module comprising:
  (i) a proportional only level controller for maintaining a desired level of liquid in the last reservoir ($V_{OUT}$), said proportional only level controller in electrical communication with the level sensor of said last reservoir ($V_{out}$), and
  (ii) a PID flow controller adapted to control the flow manipulation device of the at least one first reservoir inflow ($F_{IN}$),
  wherein said proportional only level controller is adapted to respond to the level sensor of said last reservoir and a calculated bias value resulting from the total outflow from the last reservoir to produce an output signal that is cascaded to the PID flow controller to become a set point thereof; and (b) a nested control module comprising:
  (i) a proportional only level controller for maintaining a desired liquid in the at least one first reservoir ($V_1$), said proportional only level controller in electrical communication with the level sensor of said at least one first reservoir ($V_1$), and
  (ii) a PID flow controller adapted to control the flow manipulation device of the at least one first reservoir outflow ($F_1$),
  wherein said nested control module proportional only level controller is adapted to respond to the level sensor of said at least one first reservoir ($V_1$) and a calculated bias value resulting from the total inflow to said at least one first reservoir ($V_1$) to produce an output signal that is cascaded to the nested control module PID flow controller to become a set point thereof.

2. The liquid flow system of claim 1, wherein each said controller is an analog logic, digital, logic or function module, analog or digital process controller, programmable logic controller, personal computer or combination thereof.

3. The liquid flow system of claim 1, wherein the inflow of said at least one first reservoir is comprised of a plurality of inflows ($F_{IN(1)}$ through $F_{IN(q)}$) having respective PID flow controllers and the output signal from the parenthetical control module proportional only level controller is divided among said respective PID flow controllers.

4. The liquid flow system of claim 1, wherein the inflow of said at least one first reservoir is comprised of a plurality of controllable inflows ($F_{IN(c)(1)}$ through $F_{IN(c)(q)}$) and a plurality of uncontrollable inflows ($F_{IN(u)(1)}$ through $F_{IN(u)(r)}$), each of said inflows having a respective PID flow controller wherein the parenthetical control module proportional only level controller is adapted to respond to the level sensor of said last reservoir and a calculated bias value resulting from the total outflow from the last reservoir and the total uncontrollable inflow ($F_{IN(u)(1)}$ through $F_{IN(u)(r)}$) of the at least one first reservoir ($V_1$) to produce an output signal that is cascaded to and divided amongst the PID flow controllers of the controllable inflows ($F_{IN(c)(1)}$ through $F_{IN(c)(q)}$) to provide respective set points thereto, said output being dynamically responsive to the switching of uncontrollable inflows to controllable inflows and vice versa.

5. The liquid flow system of claim 1, wherein outflow of said at least one first reservoir ($V_1$) is comprised of a plurality of outflows ($F_{1(1)}$ through $F_{1(i)}$), each having respective PID flow controllers and the output signal from the nested control module proportional only level controller is divided amongst said respective PID flow controllers.

6. The liquid flow system of claim 1, wherein the outflow of said at least one first reservoir ($V_1$) is comprised of a plurality of controllable outflows ($F_{1(c)(1)}$ through $F_{1(c)(i)}$) and a plurality of uncontrollable outflows ($F_{1(u)(1)}$ through $F_{1(u)(j)}$), each controllable or uncontrollable outflow having a respective PID flow controller, said nested control module proportional only controller adapted to respond to the level sensor of said at least one first reservoir ($V_1$) and to a calculated bias value resulting from the total inflow into said at least one first reservoir ($V_1$) and to the total uncontrollable outflows ($F_{1(u)(1)}$ through $F_{1(u)(j)}$) thereby producing an output signal that is divided amongst and cascaded to the PID flow controllers of the controllable outflows ($F_{1(c)(1)}$ through $F_{1(c)(i)}$) to become set points thereof, said output being dynamically responsive to the switching of uncontrollable outflows to controllable outflows and vice versa.

7. The liquid flow system of claim 1, wherein one or more reservoirs ($V_2$ through $V_n$) are added and inserted downstream of the at least one first reservoir ($V_1$) and upstream of the last vessel ($V_{OUT}$) and to which the nested control module is applied.

8. The liquid system of claim 7 wherein each of said one or more reservoirs ($V_2$ through $V_n$) include:

(a) a plurality of outflows ($F_{2(1)}$ through $F_{2(i)}$, $F_{n(1)}$ through $F_{n(i)}$), each having a respective PID flow controller, and (b) a proportional only level controller that is adapted to respond to the level sensor of a respective one of said one or more reservoirs ($V_2$ through $V_n$) and to a calculated bias value resulting from the total inflow into said respective one of said one or more reservoirs ($V_2$ through $V_n$) thereby producing an output signal that is divided amongst and cascaded to the PID flow controllers of the respective one of said one or more reservoirs ($V_2$ through $V_n$) to become set points thereof.

9. The liquid system of claim 7 wherein each of said one or more reservoirs ($V_2$ through $V_n$) include:

(a) a plurality of controllable outflows ($F_{2(c)(1)}$ through $F_{2(c)(i)}$, $F_{n(c)(1)}$ through $F_{n(c)(i)}$) and a plurality of uncontrollable outflows ($F_{2(u)(1)}$ through $F_{2(u)(j)}$, $F_{n(u)(1)}$ through $Fn_{(u)(j)}$), each having a respective PID flow controller, and (b) a proportional only level controller that is adapted to respond to the level sensor of a respective one of said one or more reservoirs ($V_2$ through $V_n$) and to a calculated bias value resulting from the total inflow into said respective one of said one or more reservoirs ($V_2$ through $V_n$) and to the total uncontrollable outflows ($F_{2(u)(1)}$ through $F_{2(u)(j)}$, $F_{n(u)(1)}$ through $F_{n(u)(j)}$) thereby producing an output signal that is divided amongst and cascaded to the PID flow controllers of the controllable outflows ($F_{2(u)(1)}$ through $F_{2(u)(i)}$, $F_{n(u)(1)}$ through $F_{n(u)(i)}$) to become set points thereof, said output being dynamically responsive to the switching of uncontrollable outflows to controllable outflows and vice versa.

* * * * *